US011920747B2

(12) United States Patent
Lassen et al.

(10) Patent No.: US 11,920,747 B2
(45) Date of Patent: *Mar. 5, 2024

(54) FLAME SIMULATING ASSEMBLY FOR SIMULATED FIREPLACES INCLUDING A REFLECTING LIGHT SYSTEM

(71) Applicant: Living Style (B.V.I.) Limited, Tortola (VG)

(72) Inventors: Willard Lassen, San Diego, CA (US); Paul Jones, San Diego, CA (US)

(73) Assignee: Living Style (B.V.I.) Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,542

(22) Filed: Nov. 21, 2022

(65) Prior Publication Data

US 2023/0175660 A1 Jun. 8, 2023

Related U.S. Application Data

(63) Continuation of application No. 17/379,364, filed on Jul. 19, 2021, now Pat. No. 11,519,576, which is a (Continued)

(51) Int. Cl.
*F21S 10/04* (2006.01)
*F21V 14/04* (2006.01)
(Continued)

(52) U.S. Cl.
CPC ............ *F21S 10/046* (2013.01); *F21V 14/04* (2013.01); *F24C 7/004* (2013.01); *F21W 2121/00* (2013.01)

(58) Field of Classification Search
CPC ........ F21S 10/046; F21V 14/04; F24C 7/004; F21W 2121/00
See application file for complete search history.

(56) References Cited

U.S. PATENT DOCUMENTS

| | | | |
|---|---|---|---|
| 3,978,598 | A | 9/1976 | Rose et al. |
| 4,026,544 | A | 5/1977 | Plambeck et al. |

(Continued)

FOREIGN PATENT DOCUMENTS

| | | | |
|---|---|---|---|
| CN | 1661281 | A | 8/2005 |
| CN | 2924710 | Y | 7/2007 |

(Continued)

*Primary Examiner* — Zheng Song
*Assistant Examiner* — Glenn D. Zimmerman
(74) *Attorney, Agent, or Firm* — Hinckley Allen & Snyder LLP; Stephen Holmes

(57) ABSTRACT

A flame simulating assembly is provided with a reflected flickering light that includes only one light source. Light from the light source passes through a rotating flicker element onto one or more reflectors, or mirrors, that reflect light up onto a simulated fuel bed and the some of the light is reflected off of the flicker elements towards a flame screen to create a simulated flame. The dipping flicker elements creates a fluttering light effect due to the flicker elements "intermittently dipping" into the light path. This fluctuating light is reflected onto the logs and ember bed in front and creates a dancing effect, which simulates glowing embers.

13 Claims, 18 Drawing Sheets

Related U.S. Application Data continuation of application No. 16/944,317, filed on Jul. 31, 2020, now Pat. No. 11,067,238, which is a continuation-in-part of application No. 16/004,767, filed on Jun. 11, 2018, now Pat. No. 10,731,810.

(60) Provisional application No. 62/535,938, filed on Jul. 23, 2017, provisional application No. 62/522,170, filed on Jun. 20, 2017, provisional application No. 62/522,174, filed on Jun. 20, 2017.

(51) Int. Cl.
*F24C 7/00* (2006.01)
*F21W 121/00* (2006.01)

(56) References Cited

U.S. PATENT DOCUMENTS 4,203,241 A 5/1980 Wallace
4,272,908 A 6/1981 Bassetti et al.
4,296,154 A 10/1981 Ibberson
4,726,351 A 2/1988 Whittaker et al.
4,897,524 A 1/1990 Brasell
4,965,707 A 10/1990 Butterfield
5,003,158 A 3/1991 Erkki
5,099,591 A 3/1992 Eiklor et al.
5,195,820 A 3/1993 Rehberg
5,635,898 A 6/1997 Walters et al.
5,642,580 A 7/1997 Tess et al.
5,774,040 A 6/1998 Lastoria
5,826,357 A 10/1998 Hechler
5,887,369 A 3/1999 Danielczak
5,980,059 A 11/1999 Chi
5,989,128 A 11/1999 Baker et al.
6,047,489 A 4/2000 Hess et al.
6,050,011 A 4/2000 Hess et al.
6,053,165 A 4/2000 Butler et al.
6,082,868 A 7/2000 Carpenter
6,135,604 A 10/2000 Lin
6,152,728 A 11/2000 Griffel
6,155,837 A 12/2000 Korneliussen
6,162,047 A 12/2000 Hess
6,190,019 B1 2/2001 Hess
6,269,567 B1 8/2001 MacPherson et al.
6,302,555 B1 10/2001 Bristow
6,312,137 B1 11/2001 Hsich
6,350,498 B1 2/2002 Hess et al.
6,363,636 B1 4/2002 Hess et al.
6,385,881 B1 5/2002 Hess
6,393,207 B1 5/2002 Martin et al.
6,454,425 B1 9/2002 Lin
6,461,011 B1 10/2002 Harrison
6,554,443 B2 4/2003 Fan
6,564,485 B1 * 5/2003 Hess ...................... F24C 7/004
40/428
6,615,519 B2 9/2003 Hess
6,685,574 B2 2/2004 Hall
6,691,440 B1 2/2004 Petz et al.
6,718,665 B2 4/2004 Hess et al.
6,757,487 B2 6/2004 Martin et al.
6,758,575 B2 7/2004 Winkler
6,802,782 B2 10/2004 Hall et al.
6,880,275 B2 4/2005 Mix et al.
6,919,884 B2 7/2005 Mix et al.
6,944,982 B2 9/2005 Schroeter et al.
6,953,401 B2 10/2005 Starr
6,955,440 B2 10/2005 Niskanen
6,966,665 B2 11/2005 Limburg et al.
6,968,123 B2 11/2005 Ravnbo-West et al.
7,080,472 B2 7/2006 Schroeter et al.
7,093,949 B2 8/2006 Hart et al.
7,111,421 B2 9/2006 Corry et al.
7,134,229 B2 11/2006 Hess et al.
7,162,820 B2 1/2007 Hess et al.
7,194,830 B2 3/2007 Hess
7,219,456 B1 5/2007 Wei et al.
7,234,255 B2 6/2007 Peng et al.
7,236,693 B2 6/2007 Haugom
7,281,811 B2 10/2007 Thuot Rann et al.
7,300,179 B1 11/2007 LaDuke et al.
7,305,783 B2 12/2007 Mix et al.
7,322,136 B2 1/2008 Chen
7,322,819 B2 1/2008 Lyons et al.
7,334,360 B1 2/2008 Corry
7,373,743 B1 5/2008 Hess
7,481,571 B2 1/2009 Bistritzky et al.
7,556,408 B2 7/2009 Thomson
7,668,442 B2 2/2010 O'Neill
7,670,035 B2 3/2010 Tsai
7,673,408 B2 3/2010 Hess et al.
7,686,471 B2 3/2010 Reichow
7,726,300 B2 6/2010 Lyons et al.
7,744,232 B2 6/2010 Gruenbacher et al.
7,762,897 B2 7/2010 Starr et al.
7,770,312 B2 8/2010 Stinson et al.
7,775,457 B2 8/2010 Schnuckle
7,784,959 B2 8/2010 Yang
7,798,673 B2 9/2010 Yang
7,815,328 B2 10/2010 Van Dyn Hoven
7,824,051 B2 11/2010 Walter et al.
7,826,727 B2 11/2010 Bourne
7,850,533 B2 12/2010 Osterman et al.
7,921,585 B2 4/2011 Wei et al.
7,967,690 B2 6/2011 O'Neill
8,019,207 B2 9/2011 Zhou
8,024,877 B2 9/2011 Zhu
8,081,872 B2 12/2011 Wang
8,136,276 B2 3/2012 O'Neill
8,151,498 B2 4/2012 Zhu
8,157,425 B2 4/2012 Gutstein et al.
8,166,687 B2 5/2012 Zhu
8,230,626 B2 7/2012 Abileah et al.
8,234,803 B2 8/2012 Gallo et al.
8,250,792 B2 8/2012 Zhu
8,356,435 B2 1/2013 Chen
8,361,367 B2 1/2013 Hess et al.
8,412,028 B2 4/2013 Zhu
8,413,358 B2 4/2013 Betz et al.
8,480,937 B2 7/2013 Hess et al.
8,523,692 B2 9/2013 Osterman et al.
8,574,086 B2 11/2013 O'Neill
8,579,453 B1 11/2013 Cohen et al.
8,628,223 B2 1/2014 Kwok et al.
8,641,214 B1 2/2014 Batchko
8,661,721 B2 3/2014 Hess et al.
8,671,600 B2 3/2014 Lu
8,695,247 B1 4/2014 Yang
8,713,825 B2 5/2014 Lu
8,739,439 B2 6/2014 Asofsky et al.
8,763,926 B2 7/2014 Powell et al.
8,783,888 B2 7/2014 McCavit et al.
8,904,680 B1 12/2014 Trovillion
8,904,681 B2 12/2014 Pan
9,459,010 B2 10/2016 Asofsky et al.
9,476,596 B2 10/2016 Asofsky et al.
10,371,333 B2 8/2019 Jones et al.
10,731,810 B2 8/2020 Jones et al.
2002/0023376 A1 2/2002 Hess
2002/0095832 A1 7/2002 Hess et al.
2002/0139021 A1 10/2002 Hess et al.
2002/0152655 A1 10/2002 Merrill et al.
2002/0166554 A1 11/2002 Berg
2002/0168182 A1 11/2002 Martin et al.
2002/0174579 A1 11/2002 Corry et al.
2003/0041491 A1 3/2003 Mix
2003/0046837 A1 3/2003 Hess
2003/0049024 A1 3/2003 Chen
2003/0053305 A1 3/2003 Lin
2003/0110671 A1 6/2003 Hess
2003/0156828 A1 8/2003 Jamieson et al.
2004/0060554 A1 4/2004 Schlosser et al.
2004/0114351 A1 6/2004 Stokes et al.
2004/0165374 A1 8/2004 Robinson
2004/0181983 A1 9/2004 Hess et al.

(56) References Cited

U.S. PATENT DOCUMENTS

| | | | |
|---|---|---|---|
| 2004/0264169 A1 | 12/2004 | Limburg et al. | |
| 2004/0264949 A1 | 12/2004 | Deng | |
| 2005/0063685 A1 | 3/2005 | Bristow | |
| 2005/0097792 A1 | 5/2005 | Naden | |
| 2005/0097793 A1 | 5/2005 | Hess | |
| 2005/0207155 A1 | 9/2005 | Jian | |
| 2006/0002102 A1 | 1/2006 | Leonard | |
| 2006/0101681 A1 | 5/2006 | Hess et al. | |
| 2006/0162198 A1 | 7/2006 | Hess et al. | |
| 2006/0188831 A1 | 8/2006 | Hess et al. | |
| 2006/0230656 A1 | 10/2006 | Spengler | |
| 2006/0242870 A1 | 11/2006 | Atemboski et al. | |
| 2007/0053174 A1 | 3/2007 | Lin | |
| 2007/0175074 A1* | 8/2007 | O'Neill | F24C 7/004 40/428 |
| 2007/0224561 A1 | 9/2007 | Hess et al. | |
| 2008/0004124 A1 | 1/2008 | O'Neill | |
| 2008/0013931 A1 | 1/2008 | Bourne | |
| 2008/0037254 A1 | 2/2008 | O'Neill | |
| 2008/0138050 A1 | 6/2008 | Moreland et al. | |
| 2008/0181587 A1 | 7/2008 | Patil et al. | |
| 2008/0181588 A1 | 7/2008 | Gorby | |
| 2008/0216366 A1 | 9/2008 | Purton et al. | |
| 2008/0216818 A1 | 9/2008 | Rumens et al. | |
| 2008/0226268 A1 | 9/2008 | O'Neill et al. | |
| 2009/0071047 A1 | 3/2009 | O'Neill | |
| 2009/0074390 A1 | 3/2009 | Power et al. | |
| 2009/0080871 A1 | 3/2009 | Chiu | |
| 2009/0126241 A1 | 5/2009 | Asofsky | |
| 2009/0313866 A1 | 12/2009 | Wang | |
| 2010/0031543 A1 | 2/2010 | Rice et al. | |
| 2010/0122480 A1 | 5/2010 | O'Neill | |
| 2010/0162600 A1 | 7/2010 | Betz et al. | |
| 2010/0229849 A1 | 9/2010 | Asofsky et al. | |
| 2010/0307040 A1 | 12/2010 | O'Neill | |
| 2011/0080261 A1 | 4/2011 | Asofsky et al. | |
| 2011/0110073 A1 | 5/2011 | Schnuckle et al. | |
| 2013/0031816 A1 | 2/2013 | Deng | |
| 2013/0139422 A1 | 6/2013 | Lu et al. | |
| 2013/0223043 A1 | 8/2013 | Ray | |
| 2013/0269227 A1 | 10/2013 | Hess et al. | |
| 2014/0044423 A1 | 2/2014 | Chu | |
| 2014/0126182 A1 | 5/2014 | Doud | |
| 2014/0130386 A1 | 5/2014 | Lu | |
| 2014/0140042 A1 | 5/2014 | Schreiber | |
| 2014/0168946 A1 | 6/2014 | Kaplan | |
| 2014/0268652 A1 | 9/2014 | Li | |
| 2014/0305013 A1 | 10/2014 | Peterson | |
| 2014/0313694 A1 | 10/2014 | Patton et al. | |
| 2014/0334129 A1 | 11/2014 | McCavit et al. | |
| 2014/0373406 A1 | 12/2014 | Flynn et al. | |
| 2015/0052791 A1 | 2/2015 | Lu | |
| 2015/0068079 A1 | 3/2015 | O'Neill | |
| 2015/0113840 A1 | 4/2015 | Yang et al. | |
| 2015/0131262 A1 | 5/2015 | Mabry, Jr. et al. | |
| 2015/0253013 A1 | 9/2015 | Fulkerson | |
| 2015/0338086 A1 | 11/2015 | Patton | |
| 2015/0338087 A1 | 11/2015 | Fang | |
| 2015/0338105 A1 | 11/2015 | Lu | |
| 2015/0377492 A1 | 12/2015 | Tynes | |
| 2016/0109081 A1 | 4/2016 | Thompson et al. | |
| 2016/0169528 A1 | 6/2016 | Lu | |
| 2016/0169537 A1 | 6/2016 | Lu | |
| 2016/0195277 A1 | 7/2016 | Li | |
| 2016/0258585 A1* | 9/2016 | Gallo | F21S 10/046 |
| 2017/0089587 A1 | 3/2017 | Nemes et al. | |
| 2017/0167678 A1 | 6/2017 | Gallo et al. | |
| 2017/0328575 A1* | 11/2017 | Crowe | F24C 7/004 |
| 2018/0299086 A1* | 10/2018 | Gallo | F21S 10/046 |
| 2019/0293297 A1 | 9/2019 | Baird | |

FOREIGN PATENT DOCUMENTS

| | | | | |
|---|---|---|---|---|
| CN | 201662135 U | | 12/2010 | |
| CN | 202521701 U | | 11/2012 | |
| CN | 205536076 U | | 8/2016 | |
| GB | 2402469 A | | 12/2004 | |
| GB | 2411228 A | * | 8/2005 | F24C 7/004 |

* cited by examiner

FLAME SIMULATING ASSEMBLY FOR SIMULATED FIREPLACES INCLUDING A REFLECTING LIGHT SYSTEM

CROSS-REFERENCE TO RELATED APPLICATIONS

This application is a continuation of U.S. patent application Ser. No. 17/379,364, filed Jul. 19, 2021, which is a continuation of U.S. patent application Ser. No. 16/944,317, filed Jul. 31, 2020, now U.S. patent Ser. No. 11/067,238 issued Jul. 20, 2021 which is a continuation-in-part of U.S. patent application Ser. No. 16/004,767 filed Jun. 11, 2018, now U.S. patent Ser. No. 10/731,810, issued Aug. 4, 2020, and is also related to, and claims the benefit of U.S. Provisional Application No. 62/522,165 filed Jun. 20, 2017, U.S. Provisional Application No. 62/522,170 filed Jun. 20, 2017, U.S. Provisional Application No. 62/522,174 filed Jun. 20, 2017, and U.S. Provisional Application No. 62/535,938 filed Jul. 23, 2017, the entire contents of which are all incorporated herein by reference.

BACKGROUND

1. Technical Field

The present disclosure relates generally to artificial or simulated fireplaces and stoves, and more particularly to an electronic flame simulating assembly with an enhanced flickering light and modular design.

2. Background of the Related Art

In simulated fireplaces, electronic flames or simulated flames are often used to provide the simulated fireplace with a more realistic visual flame or fire effect and also to play a role in decoration. Prior art flame simulation devices may include a light source and rotating reflector which are installed behind or beneath a screen wall with flame-shaped slots, also called a flame screen. Many prior art devices also include two-way mirrored back walls which temper the passage of backlighting to soften the edges of simulated flames created behind the back wall. However, these false back walls add substantial depth to the devices. These configurations take up more space, are more costly, and are more fragile in transit.

Many devices additionally include a simulated fuel bed that includes simulated logs and embers of the fire. The simulated fuel bed and logs must be independently lit by a separate light source(s) adding further cost and complexity to the devices.

Therefore, there is a perceived need in the industry for a simulated fireplace that includes a fuel bed and flame screen that have an enhanced simulated burning visual effect, that does not require additional back lighting components which can significantly increase the cost of manufacture and cost or operation of the simulated fireplace. Furthermore, there is also a desire to reduce cost of operation of simulated fireplaces, namely, reduced electrical needs of the simulated fireplace.

SUMMARY

The present disclosure provides in one respect, a flame simulating assembly with a reflected flickering light system that includes a light source that shines through a rotating flicker rod with a plurality of flicker elements. Some of the light from the light source is reflected off of the rotating flicker element up towards a flame screen to create a flame effect. Some of the light from the light source passes though the rotating flicker elements onto an angled reflector, or mirror, that reflects light up onto a simulated fuel bed. The light that is reflected off the mirror first passes through gaps in the flicker elements as the flicker rod rotates and the terminal ends of the flicker elements dip into and out of the light path. The dipping flicker elements creates a fluttering light effect due to the flicker elements "intermittently dipping" into the light path. This fluctuating light is reflected onto the logs and ember bed in front and creates a dancing effect, which simulates glowing embers and burning logs. The logs and ember bed may or may not be additionally lit from the inside. A significant portion of the emitted light is also reflected from the flicker elements and up through a screen wall with flame-shaped slots and openings, and onto an imaging screen or wall, to further simulate flames.

Another novel aspect of the present disclosure solves the problems of the prior art by providing a flame simulating assembly with a flame screen that has non-continuous flame-shaped segments that have sharper edges, are generally wider than they are tall, and taper outwardly from the center to the edges of the flame screen. The non-continuous flame-shaped segment can, for example, be non-continuous in a vertical direction, or along the beam angle of the light source. This unique flame shape configuration results in a more pronounced triangular shape of the resulting simulated flame. The triangular outline shape of the non-continuous cutouts can create an artificial fire shape that better resembles a real fire, and that is wider at the bottom than at the top, with greater intensity at the center than at the edges. In alternative embodiments, the non-continuous cutouts can have an outline of any other shape including an elongated triangular, rectangular, oval, parabolic, sinusoidal, etc. shape.

Further embodiments can include an improved simulated light assembly which can channel, or direct, light at a desired forward angle and prevent side spill of light to provide for enhanced flame shapes for a more realistic flame. While the terms, channel and direct, are used, this is not intended to limit the function of the device. A portion of the light may be channeled while other portions of the light may diffuse through the channel walls.

A further novel aspect of the present disclosure provides a flame simulating assembly with an integrated ember bed and flame screen assembly. The integrated ember bed and flame screen may be molded as a single piece of plastic, providing many advantages. The ember bed can be lit from inside by the flicker element, creating a glowing ember bed, in addition to projecting the simulated flame through an integrated flame screen. The cost is reduced since the flame screen may be made from the same plastic instead of steel, injection molded instead of stamped in a secondary forming operation, and the depth can be decreased due to the elimination of a barrier between flicker element and ember bed. The cutout shapes of the flame screen may also be advantageously punched out, either before or after injection molding. Separate logs or grate elements can be attached or built into the molding process. The molding process can be any molding process including injection molding, vacuum molding, or blow molding. Moreover, in some embodiments, the integrated assembly can be fused together after discrete portions are molded.

Some embodiments may also include rear reflectors, floor reflectors and/or multiple vertically stacked rows of LEDS above and/or below the central axis of the flicker rod.

Accordingly, it can be seen that the present disclosure provides a unique and novel flame simulating assembly with improved flame appearance, better design, fewer parts and less cost.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE EXEMPLARY EMBODIMENTS

Figure 1:
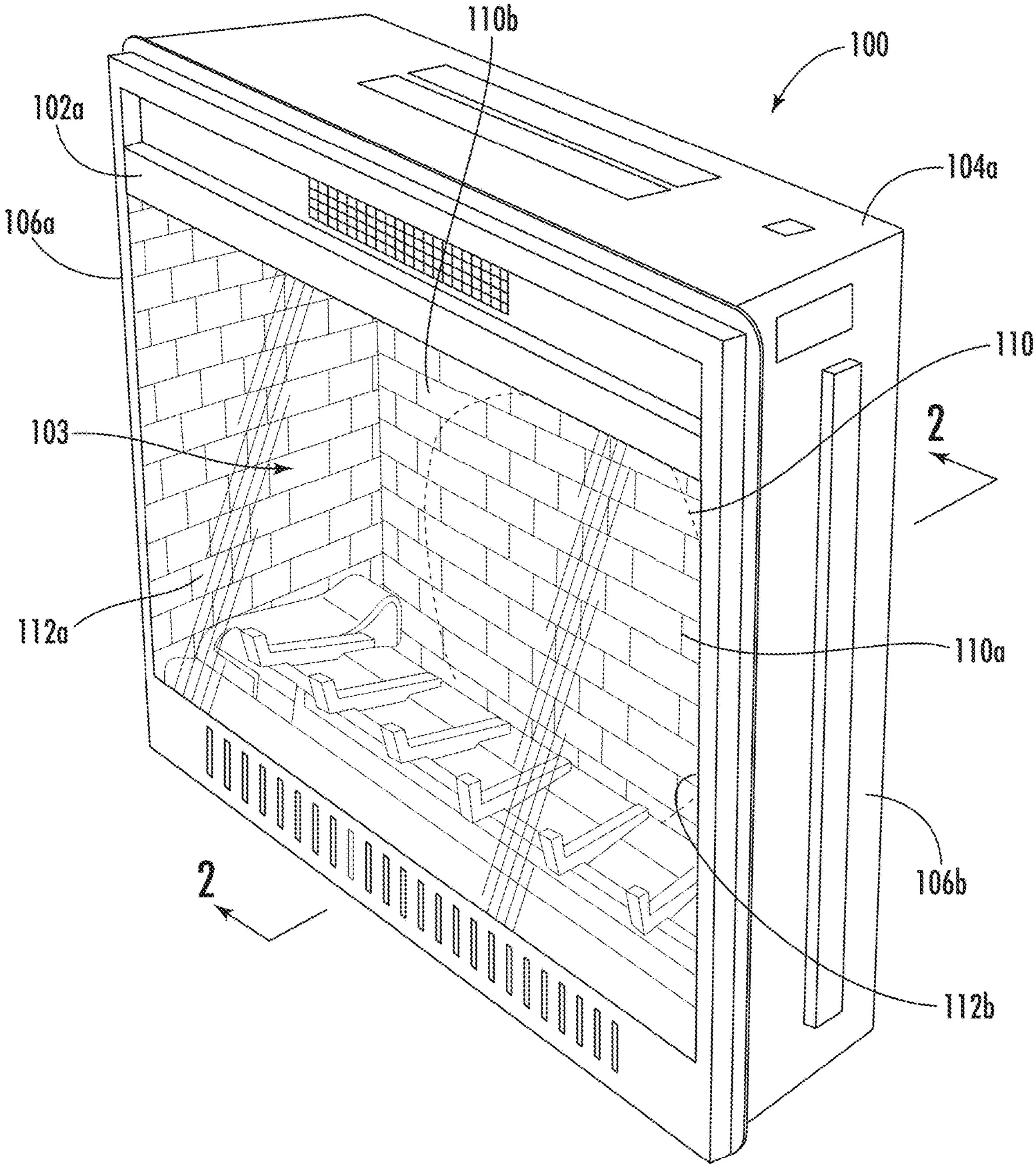
FIG. 1 is a perspective view of a first exemplary embodiment of an electric fireplace.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Generally, a novel, electronic simulated fireplace is disclosed. As noted above, traditional electric or electronic fireplaces suffer from a number of drawbacks including complicated manufacturing, a large number of parts, poor quality flame projections, and housing sizes that are too large for many locations. The instant disclosure provides a number of advantages over the prior art. The instant disclosure provides a number of sub-assemblies that individually, or in combination, provide a more realistic moving image of fluctuating flames, a more realistic glow for an ember bed, a more compact design, or a more integrated design.

In an exemplary embodiment, illustrated in FIGS. 1-15, the electric fireplace 100 can include a housing, or enclosure, 101 having front and back walls 102*a*, 102*b*, top and bottom walls 104*a*, 104*b*, and side walls 106*a*, 106*b*. Through an opening 108 in the front wall 102*a* a firebox cavity 103 can be defined which is visible through a transparent glass panel or a set of glass doors (not shown). The firebox cavity 103 can be defined by a firebox rear wall 110, firebox top and bottom walls, and firebox side walls 112*a*, 112*b*. The firebox cavity 103 is intended to create the appearance of a traditional fireplace firebox. The side walls 112*a*, 112*b* and the rear wall 110 may or may not be given the appearance of brick or stone to provide an authentic look and feel. The side walls 112*a*, 112*b* may or may not be angled relative to the rear wall 110. In the illustrated embodiment, a gradation of color from a central location 110*a* on the firebox rear wall to the firebox side walls may provide the illusion of soot build-up 110*b* towards the outer edges while also providing a brighter, lighter central portion for enhanced reflection and flame appearance in the center. For example, the central portion 110*a* may be yellow, red, brown, or brick colored, and the color can then fade to a black, grey, or generally soot-like color as it extends away from the central portion forming a gradation 110*b*. Alternatively, the firebox side walls 112*a*, 112*b* and the firebox rear wall 110 can have any appearance, texture, or color.

Figure 17:
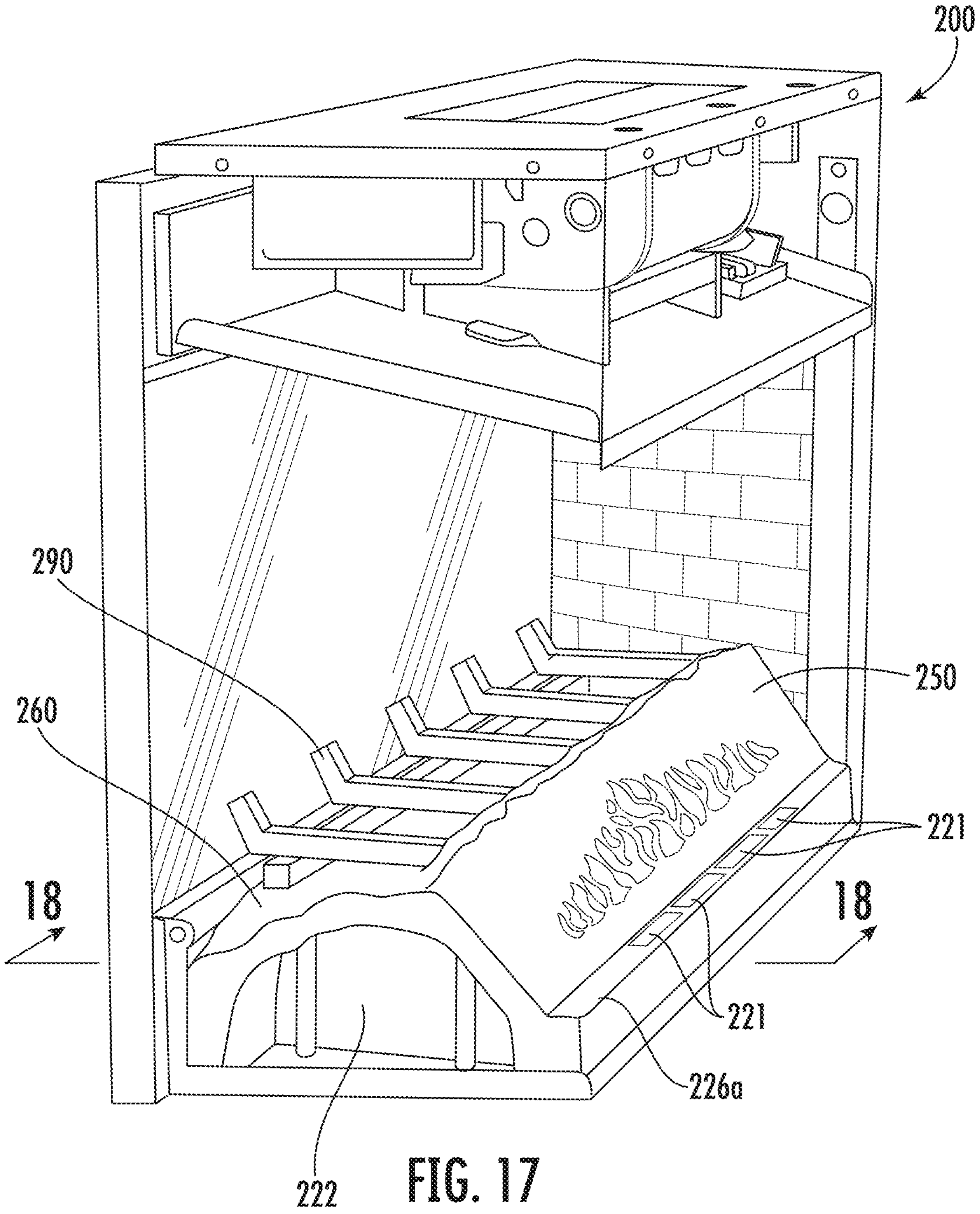
FIG. 17 is a partial perspective view of a second exemplary embodiment of an electric fireplace with an integrated ember bed and flame screen.
Figure 18:
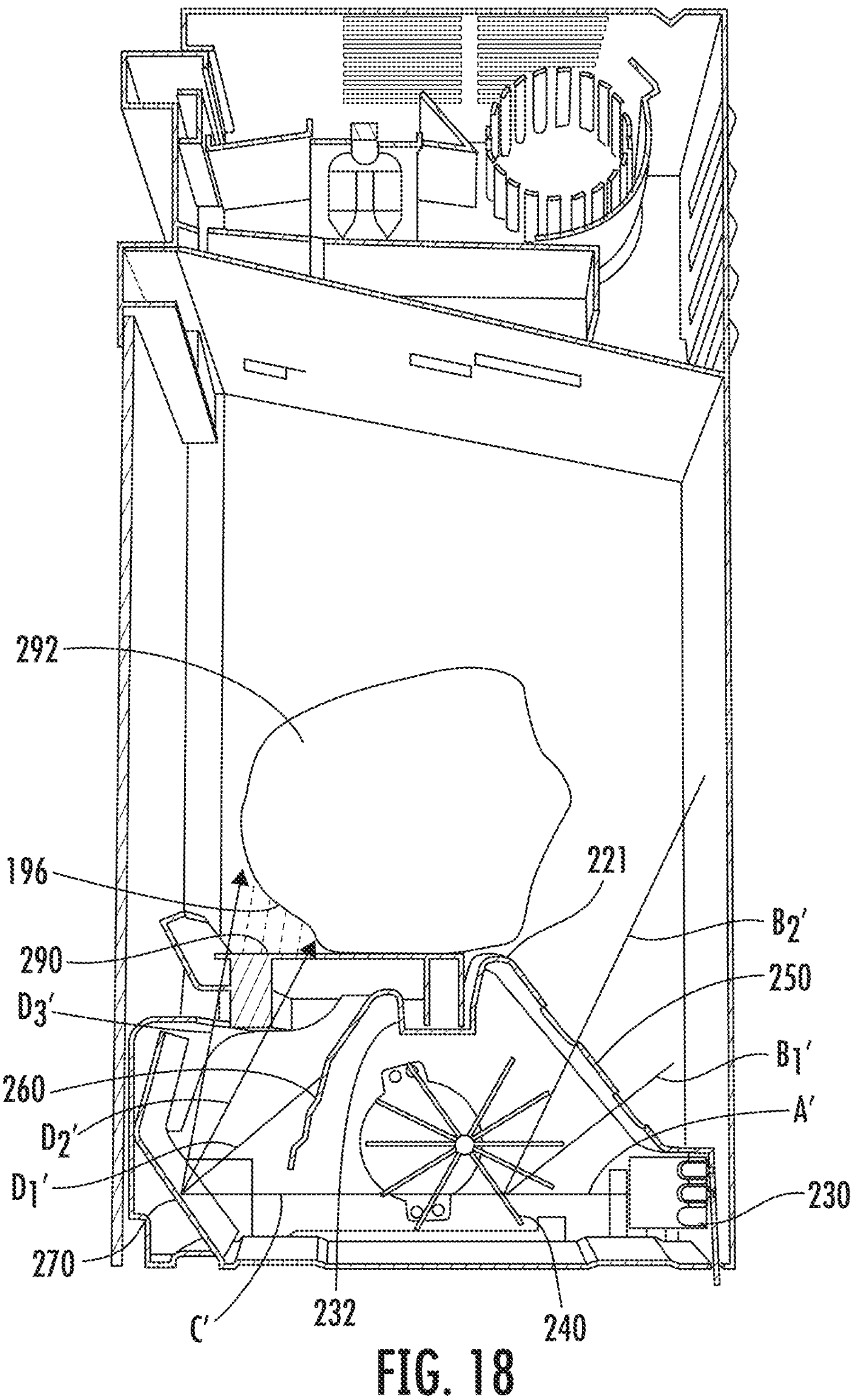
FIG. 18 is a partial perspective cross-sectional view of the fireplace of FIG. 17.

The interior of the housing can provide space for various internal components of the electric fireplace, including a heater/blower unit (not shown in this embodiment) which provides a warm air flow from the fireplace unit 100 and further including a flame simulation assembly 120 which provides the visual effect of moving flames on the firebox rear wall 110. Referring briefly to FIGS. 17-18, an exemplary configuration of the heater is located in a compartment at the top of the housing. However, in alternative embodiments, the heater can be disposed in other areas of the device. In general, the heater/blower unit can be controlled, with a controller (not shown), to provide hot air to heat the surrounding area to further add to the realism of the electric fireplace and its' utility as a space heater. The controller can additionally be used to control the flame simulation assembly and any other feature of the device.

The flame simulation assembly 120 can generally include a flame simulating light source 130, a flicker element 140, and a flame simulator element (flame screen) 150 all of which work in concert to create the shape and appearance of moving flames on the firebox rear wall 110. In the illustrated embodiment, the rear wall 110 functions as an imaging screen, and the flame simulating components are located in front of the rear wall 110. The rear wall panel 110 may alternatively have other shape configurations and/or have areas of matte or glossy finishes depending on the desired flame effect and the configuration of the flame simulating assembly 120 located forwardly thereof. In addition to the flame simulation assembly 120, the fireplace 100 may include an ember bed simulation assembly 160. In some embodiments the ember bed simulation assembly 160 is a fully, or partially, separate assembly from the flame simulation assembly 120. In other embodiments, the ember bed simulation assembly 160 is integrated into, and with, the flame simulation assembly 120. As will be discussed in detail below, the various embodiments can provide an enhanced realistic flame and ember simulation. In some embodiments, various sub-assemblies can be integrated together to decrease the overall footprint of the fireplace assembly.

Figure 2:
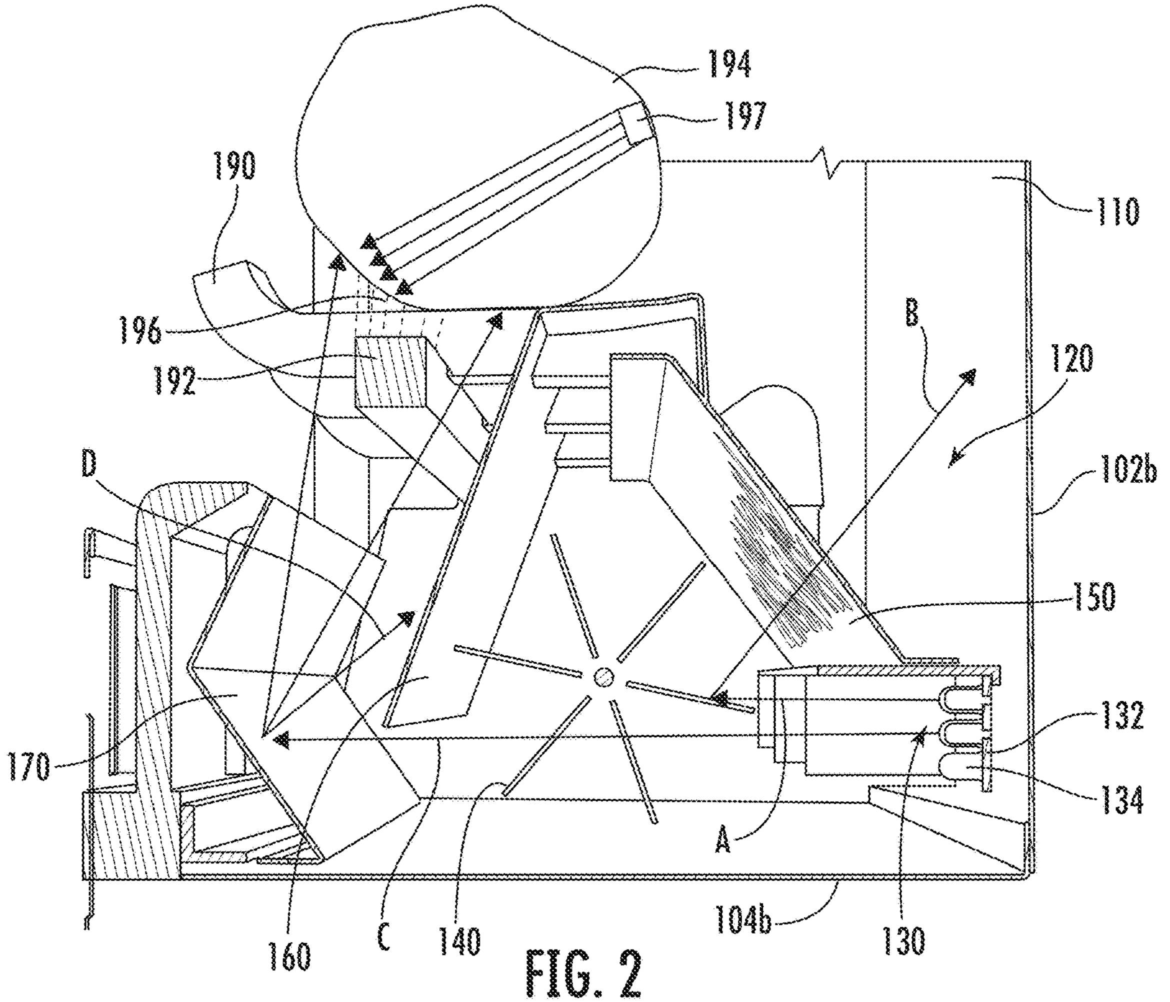
FIG. 2 is a partial perspective cross-sectional view of the fireplace of FIG. 1.
Figure 2A:
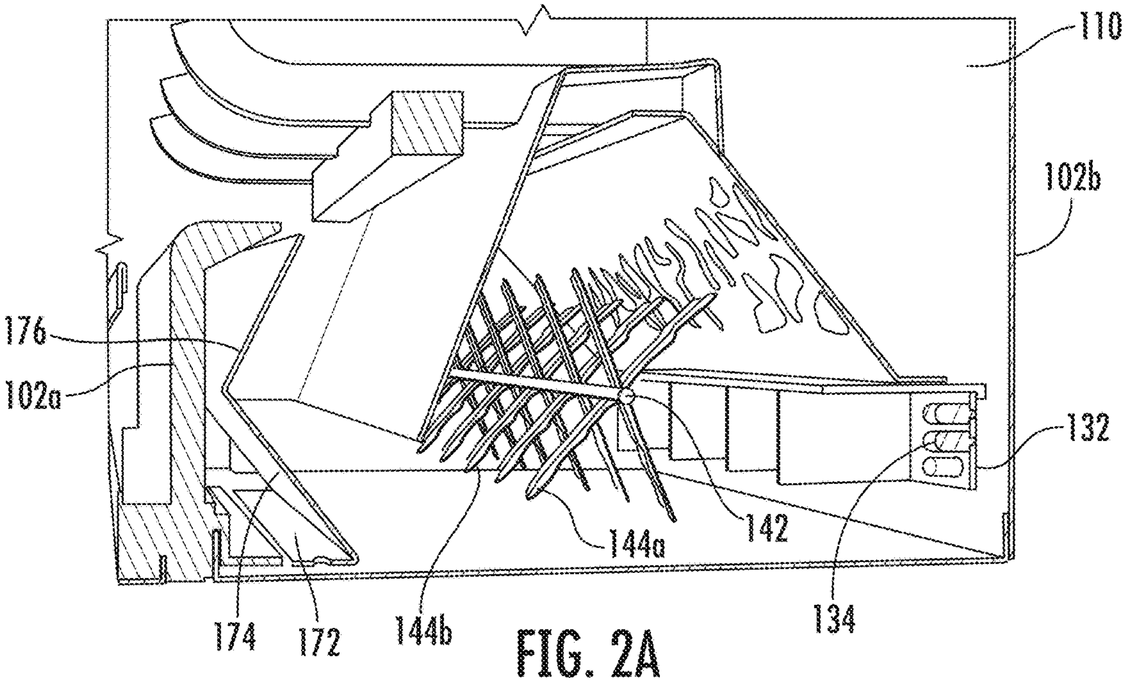
FIG. 2A is a partial perspective cross section view of the fireplace of FIG. 1.

In the first embodiment, as shown in FIGS. 1, 2, and 2A, the electric fireplace 100 is shown. As noted above, the electric fireplace 100 can generally include a housing 101 having a heater at a top portion thereof and a flame simulation assembly 120 and an ember bed simulation assembly 160 in a bottom portion thereof.

In general, the flame simulation assembly 120 can include a single flame simulating light source 130 which can be used to illuminate both a flame simulation assembly 120 and an ember bed simulation 160 assembly—without additional light sources. The flame simulation assembly 120 can generally include the flame simulating light source 130, a light shield 131, a rotating flicker element 140 which can angle the light generated by the light source 130, and a flame screen 150. The flame simulation assembly 150 can be a single subassembly housed by a flame simulation housing 122. The flame simulation housing 122 can have two sidewalls 124*a*, 124*b*, a lower rear wall 126, and an upper rear wall 128. In the illustrated embodiment, the lower rear wall 126 can have a generally upside-down "L" shape that includes an upper horizontal piece 126*a* and a lower vertical piece 126*b*. Extending upward and forward, at an angle, from a forward edge of the upper horizontal piece 126*a* can be the flame screen support 128. The flame screen support 128 can be disposed in an angle of approximately 50 degrees to 70 degrees from the horizontal. In the illustrated embodiment the flame screen support 128 has a flame screen 150 integrated directly thereon.

Figure 5:
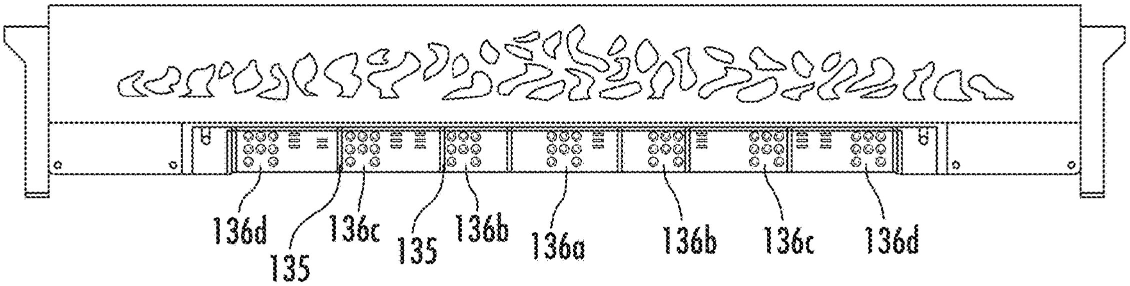
FIG. 5 is a rear view of the flame simulation sub-assembly of FIG. 4.
Figure 8:
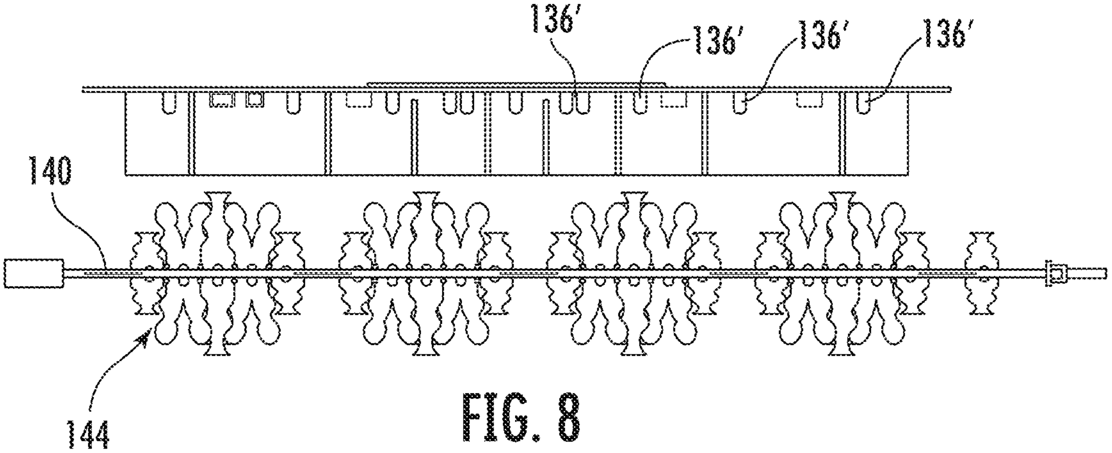
FIG. 8 is a bottom view of a light assembly, light shield, and flicker assembly.
Figure 9:
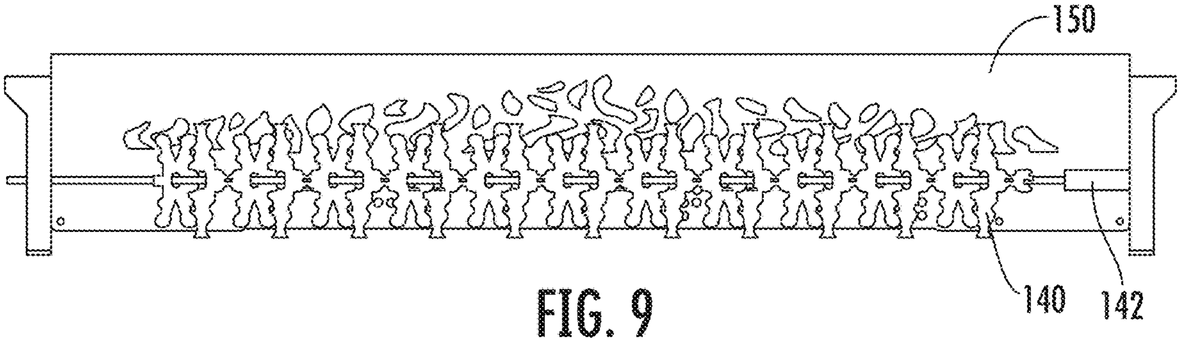
FIG. 9 is a front view of the subassembly of FIG. 8.
Figure 10:
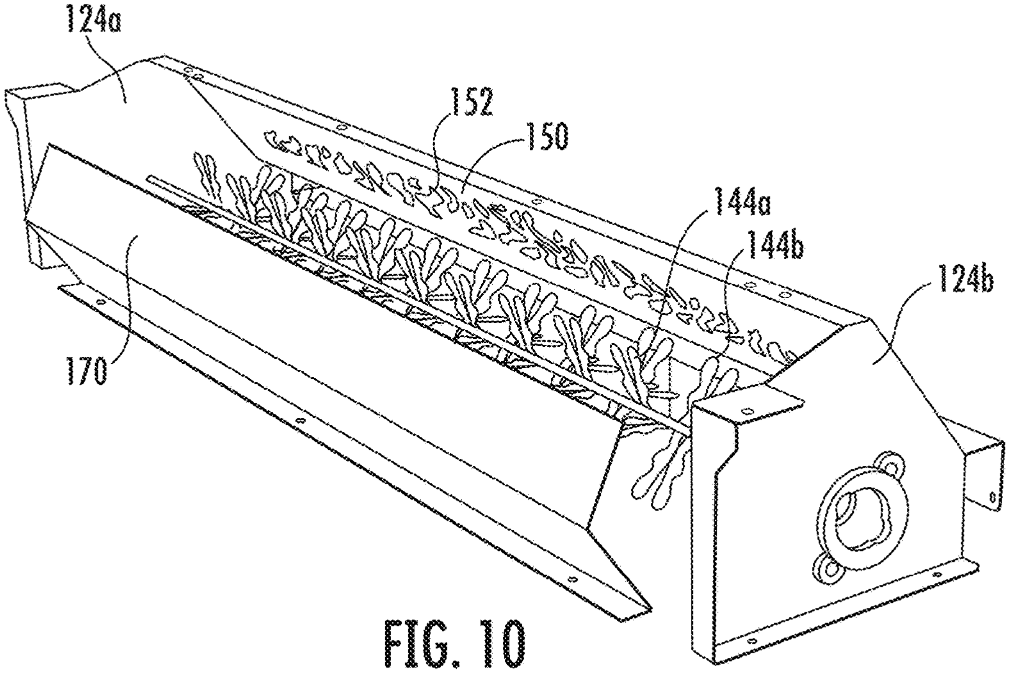
FIG. 10 is a perspective view of the subassembly of FIG. 8.
Figure 11:
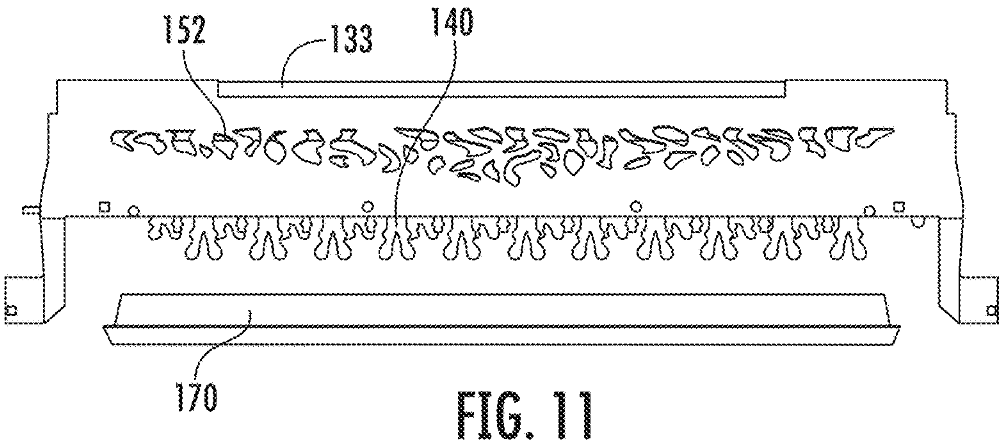
FIG. 11 is a top view of the subassembly of FIG. 8 with a front reflector.

The single light array, or source, 130 can be disposed beneath the flame screen 150 proximate on the lower rear wall 126 of the flame simulation housing 122. The light array 130 can include a plurality of bulbs or light emitting diodes (LEDs) 134 disposed on a printed circuit board (PCB) or mounted on a support 132 and wired together. In the exemplary embodiment, the light array 103 is disposed against the lower rear wall 126*b* and oriented such that the PCB 132 is parallel to both the rear and front walls 102*a*, 102*b* and the bottom and top walls 104*a*, 104*b*. In an alternative embodiment (see FIGS. 23-26), the light array 130 can be angled upward relative to the rear wall 110 so that it is partially directed up towards the top wall 104*a* of the fireplace housing 101. This arrangement will be discussed hereinafter with regards to the embodiment of FIGS. 23-26. In some embodiments, the light array 130 can be an elongated panel that includes a plurality of sources 134. The light sources 134 can be any of traditional incandescent light bulbs, halogen bulbs, fluorescent bulbs, or light emitting diodes (LEDs) disposed thereon. The light sources 134 can be any color including white, or various hues of yellow, red, orange, blue, and violet. The various colors and color combinations can be used to create a realistic flame effect. In the illustrated embodiment, as shown in FIG. 5, LEDs are shown in an array of groups 136 of LEDs. The groups of LEDs 136 can be three columns of LEDs 134, with three, two, and three LEDs disposed in columns. The LEDs 134 in each column can be aligned with the LEDs of the other columns such that they form rows. Alternatively, any number of LEDs 134 can be grouped in the array 130. For example, as shown in FIG. 8, two groups of LEDs on either side of the center LED group can include three LEDs each, in a generally triangular shape. Any of the groupings of LEDs 136 can have any geometric configuration. The array of LEDs, as shown, are arranged such that the distance between each of the LED groups 136 changes, as shown in FIG. 5. The center LED group 136*a* can be a first distance D1 from the second sets 136*b* on either side. The third sets 136*c* can be a second distance D2 from the second sets 136*b*. The fourth sets 136*d* can be a third distance D3 from the third sets 136*c*. The first, second, and third distances D1, D2, D3, can be equal or different than one another. Moreover, any number of groups 136 can be used. The locations of LED groups 136*a-d* can be a function of the design of the flame shield 150 used, as discussed below. However, in some alternative embodiments, the distance between the LED groups 136 can be the same along the length of the array 130. This single light array 130 is designed to output enough light to create realistic flames on the rear wall 110 of the housing, a glow effect on the rear wall of the housing and illuminate the ember bed 160 and logs 192 to simulate burning embers and logs.

Figure 4:
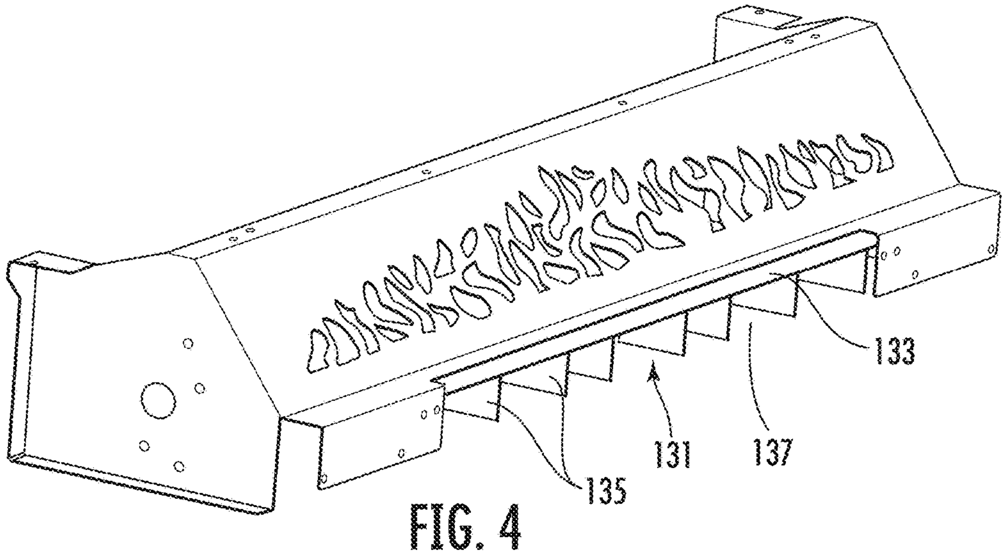
FIG. 4 is another rear perspective view of the flame screen of FIG. 3 with a light shield in accordance with the teachings of the present invention.

As noted above, the flame simulation assembly 120 can additionally include a light channeling shield, light focusing system, or light path guidance system, 131 to further optimize the realism of the flames generated thereby. Referring now to FIG. 4, an exemplary embodiment of a light channeling shield 131 is shown generally disposed in the flame simulation assembly 120. In order to mitigate, or prevent, the crossing of flames or diagonal flame shapes, a partition shield can be used to block the light shining from the LED groups 136 at steep beam angles. In other words, each individual LED group 136 can have a beam angle that defines how much the light is distributed. The exemplary light shield 131 can direct, or focus, the light from the LED groups 136 such that each LED group 136 is only illuminating certain portions of the flame simulation assembly 120 or the ember bed assembly 160. The exemplary light channeling shield 131 accomplishes this goal by providing a channel 137 for each group of LEDs 136 in the array 130 to direct the light emitted therefrom. The shield 130 can be made from an opaque or translucent material to permit a select amount of diffuse light to pass therethrough. Alternatively, the shield 131 can be made from a solid material that may prevent light from crossing over into other channels 137. In a further alternative, the top wall 133 can be made from a translucent material and the side walls 135 can be opaque. The shield 131 can be designed such that each channel 137 has the correct geometry to channel the light in a forward direction away from the LED panel 132. In general, the shield 131 can include a longitudinally extending planar top wall, or upper plate, 133 with a plurality of perpendicular spaced shield walls, or partition, 135. The spaced shield walls 135 can be arranged such that they are spaced to accommodate the spacing of the LED groups 136 discussed above, as shown in FIG. 5. Moreover, the shield walls 135 can have a length that is approximately equal to the width of the top plate 133. The top wall 133 can be translucent such that a desired amount of diffuse light is permitted to shine through to create a glow effect on the back wall 110 of the housing, creating a secondary glowing effect of the ember bed giving off more light from its base. In alternative embodiments, each LED or group of LEDs 136 can have individual shade or cone walls, or partitions, disposed around each group or around each LED. Such alternative walls can have alternative shapes, geometries and configurations that provide the effect of creating "spot lights" to direct or focus the light in the desired areas of the assembly.

Figure 6:
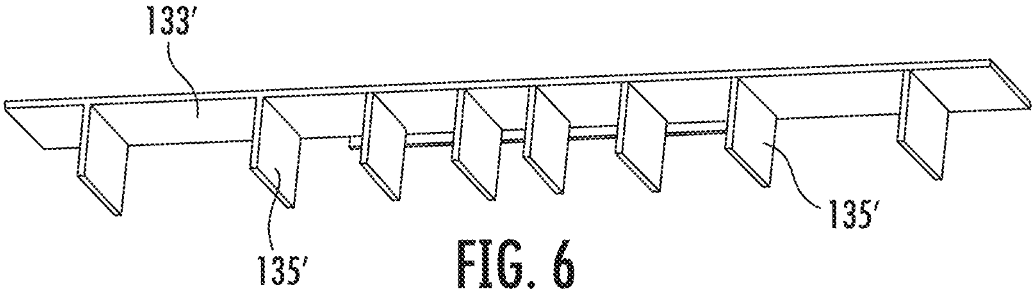
FIG. 6 is a bottom perspective view of a first embodiment of a light shield.
Figure 7:
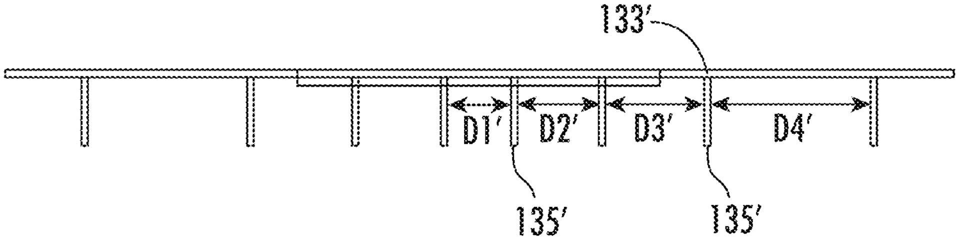
FIG. 7 is a front view of the light shield of FIG. 6.

In an alternative embodiment, a light source 132 and light channel 131 can have LED groups 136', and the associated shield walls 135', closer in the middle with gradually farther apart toward the outer edges. For example, as shown in FIGS. 6-8, the middle, first, two shield walls 135' can be spaced a distance D1'. The shield walls 135' can be mirrored on either side of the centerline in the illustrated embodiment, for the sake of ease, only one side of shield walls 135' will be discussed. The second shield wall can be spaced a distance D2' from the first shield wall, the third shield wall can be spaced a distance D3' from the second shield wall, and the fourth shield wall can be spaced a distance D4' from the third shield wall. In the illustrated embodiment, D1'<D2'<D3'<D4'. This can match the overall design of the flame cutouts (taller in the middle) of a flame shield (not shown) and will more effectively illuminate the center of the flame cutouts. However, in other embodiments, the distance between the shields can be equal, or have any suitable dimensioning.

Figure 3:
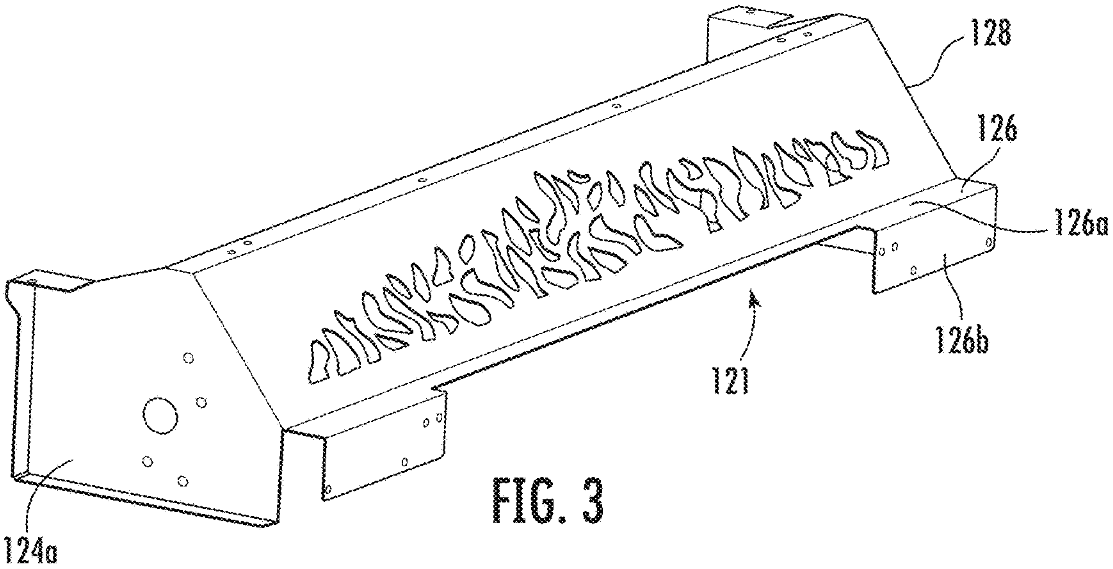
FIG. 3 is a rear perspective view of a flame screen assembly of the fireplace of FIG. 1.

Referring back to FIGS. 3-5, the secondary effect of directing a diffuse glow onto the back-imaging panel 110 and side walls 110*a*, 110*b* can contribute to the simulation of the glow of a real fireplace. For example, as shown in FIGS. 3-5, the flame simulation housing 122 can include a cutout 121 on the upper horizontal piece 126*a* of the lower rear wall 126. The top surface 133 of the light shield 131 can be partially, or completely, disposed within the cutout 121. As noted above, the light shield 131 can be translucent so as to allow a desired amount of light from the LEDs to pass therethrough. The light can pass up through the cutout 131 to the back wall 110 to create a glow. The glow effect may be separate from the light channel effect 131 and could be used independently of the light channel shield 131. A translucent material of sufficient diffusive properties could be used to take advantage of existing LED light, or light from a secondary LED source to create a glow.

Referring to FIGS. 4, 5, 9, and 10, the shield 131 can be positioned between the LEDs 134 and the flicker spindle, or rotating flicker rod, 142 or between the flicker rod 142 and the flame effect cutout 150. The shallower angle light channeled by the shield 131 effectively illuminates and creates realistic vertically extending flame images, while the shield 131 blocks steep beam angle light from jumping across to adjacent cutout portions 152 of the flame screen 150 and creating distorted horizontally extending flame images. Therefore, it can be seen that the simulated flame assembly 120 provides a unique solution to the problems of the prior art by providing a simulated flame assembly with a light channeling shield 131 that more accurately directs shallow angle light through the flame screen cutouts 152 and provides a background glow effect.

The light from the light source 134 can pass through the light shield 131 such that it is directed towards the rotating flicker rod 140. The portion of the light that hits the flicker element, as shown via arrow A, is reflected through the slotted flame screen, as shown via arrow B, and onto the imaging wall, forming a simulated flame. A portion of the light may also pass intermittently through the flicker element, as shown via arrow C, and onto the reflector, where the light is reflected, as shown via arrow D, onto simulated ember, or fuel bed, 160 creating a glowing or burning ember effect. The spaced arrangement of the reflector elements also allows a portion of the light on path (C) to pass directly to the front reflector 170 (see FIG. 9).

Figure 12:
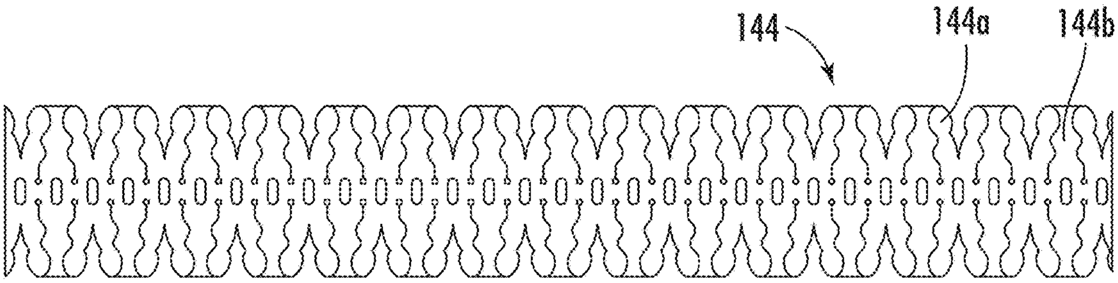
FIG. 12 is a top view of an embodiment of a flicker element in a flat configuration before assembly onto the electric fireplace.

As noted above, light from the LEDs 134 is directed through the light channel 131 towards the flicker element portion 140 of the flame simulation assembly 120. Generally, the flicker element 140 can be disposed on a flicker rod 142 which turns about an axis that is generally located vertically above at least a portion of the LEDs 134, for example above the light path A. The rod 142 can be supported by the light simulation housing side panels 124*a*, 124*b*. Further, a motor (not shown) can be secured to one of the light simulation housing side panels 124*a*, 124*b* and retain one terminal end of the rod 142 therein. The motor can rotate the rod 142 such that the flicker element 144 rotates with the rod 142 to create a flicker effect. In the illustrated embodiment, the flicker element 144 can be a single piece of reflective material that is threaded onto, and secured to, the rod 142. In some embodiments, the flicker element can be stamped as a single piece of material, as shown in FIG. 12. The flicker element 144 can be alternatively laser cut, manually cut, or molded. Further, the flicker element 144 can be made from any flexible or semi-flexible material that is reflective. In one embodiment, the flicker element 144 can be made from a reflective mylar strip. The flicker element 144 can have a variety of shapes and designs to permit the light from the LEDs 134 to selectively be reflected upwards towards the flame screen 150 or passed through to be reflected onto the ember bed 160. In the illustrated embodiment, the flicker element 144 can be threaded onto the rod 142 such that there are two types of paddles, flicker shapes, or flamelets. A plurality of first "X" shaped type paddles 144*a* are fixed to the rod 142 in a first angular orientation relative to the rod and a plurality of second "X" shaped type paddles 144*a* fixed to the rod 142 in a second angular orientation relative to the rod. The plurality of first "X" shaped paddles and the plurality of second "X" shaped paddles 144*a* can be angularly offset from one another with respect to the rod 142. The second type of paddle can be an "I" shaped paddle 144*b* which can be angularly offset from another set of "I" shaped paddles 144*b* and both of the plurality of first and second "X" shaped paddles 144*a*. The relative spacing and orientation of the various paddles 144 can be a function of how the flicker element 144 is threaded onto the rod 142. Each of the "I" and "X" shaped paddles 144*a*, 144*b* can have contoured edges, undulating outline, elongate curvilinear outline, or a unique wavy patterned outline as shown in at least FIGS. 2A and 9-12. For example, the width of the arms of the paddles 144*a*, 144*b* can vary between thicker portions and thinner portions as a function of the undulating outline.

As illustrated, the rod 142 of the flicker element 149 is disposed forward of the LED panel 132, towards the front wall 102*a*, and vertically above the LEDs 132, away from the bottom wall 104*b*. In use, as the rod 142 is rotated by the motor, the distal ends of the paddles 144 move into and out of the path of the light from the light source 132, such that the paddles "dip" into the path of light, see light path arrows C and D, as shown in FIG. 2. The relative angular locations of the paddles 144 and the relative side-to-side spacing thereof can permit a portion of the light to reflect off the plurality of paddles 144 and onto the flame screen when they "dip" into the path of the light. When the paddles 144 are not "dipping" into the path of the light, the light is able to pass by or around the flicker element 140 and onto the ember bed reflector 170, as discussed further below, then up towards the ember bed 160. The dipping flicker elements 144 creates a fluttering light effect due to the flicker elements "intermittently dipping" into the light path. This fluctuating light is reflected off the ember bed reflector 170 through to both the ember bed 160 in front and the logs 192 to create a dancing effect, which simulates glowing embers and logs. The angularly offset relationship and linear spacing of the various paddles 144, or flicker elements, can provide for the advantage of using a single light source 130 to illuminate, or activate, the ember bed 160 and the simulated flames (on the rear imaging wall 110).

In use, the light from the LED array 130 is directed, by the light shield 131, at the flicker element 140. A portion of the light is reflected against the paddles 144 upward towards the flame screen 150. A further portion of the light passes through the flicker element 140 towards the ember bed reflector 170, which is discussed further below. Therefore, it can be seen that the simulated flame assembly 120 provides a unique solution to the problems of the prior art by providing a simulated flame assembly 120 with a reflected flickering light that relies on a single light source 130 to light the fuel bed 160 and simulated flame yet provides a simulated burning effect to both. Consequently, component manufacturing costs and electricity usage of the simulated fireplace are reduced.

Figure 16:
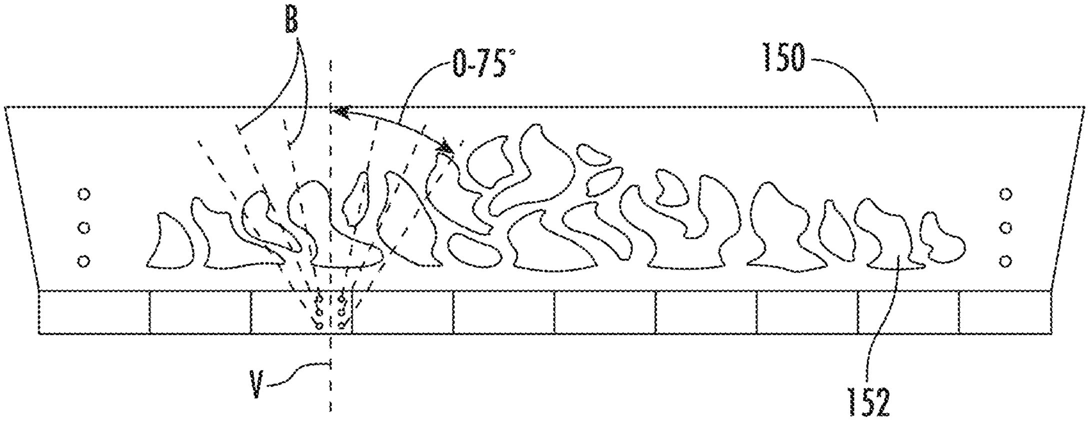
FIG. 16 is a top perspective view of a flame screen.

The light that is reflected upward from the flicker element 140 is directed towards the flame screen 150 before passing to the back wall 110. The flame screen can selectively permit the reflected light, from the flicker element, through to the back wall. Advantageously, the exemplary flame screen includes vertically non-continuous flame cut outs which are segmented along the path of reflected light. The non-continuous flame screen can, for example, be non-continuous in a vertical direction, or along the beam angle, or light path, of the light source as shown in FIG. 16. In some embodiments the flame screen can be removably fitted to the flame simulation housing so that alternate flame screens can be used. In other embodiments, as shown in FIGS. 3-5, the flame screen can be integral in the housing.

Figure 13:
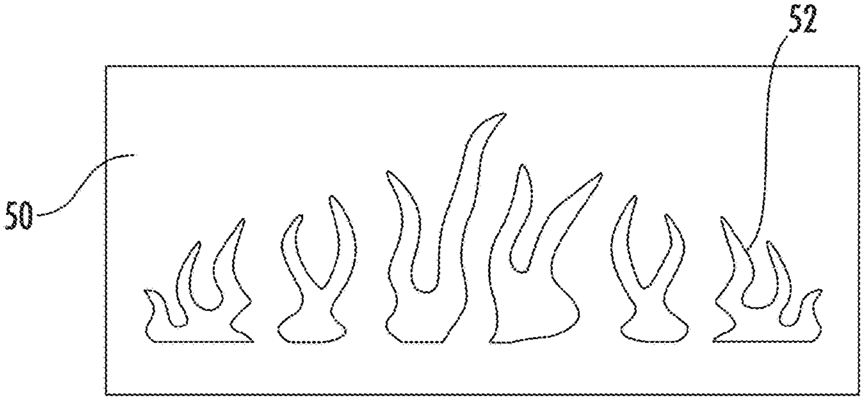
FIG. 13 (PRIOR ART)
FIG. 13 is a schematic of a prior art flame screen.
Figure 14:
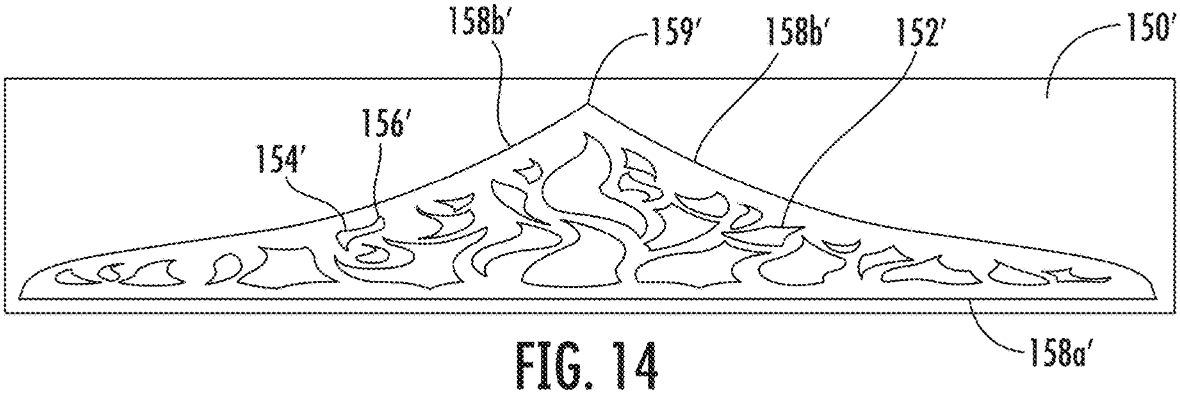
FIG. 14 is a schematic of an embodiment of a flame cut-out in accordance with the present invention.
Figure 15:
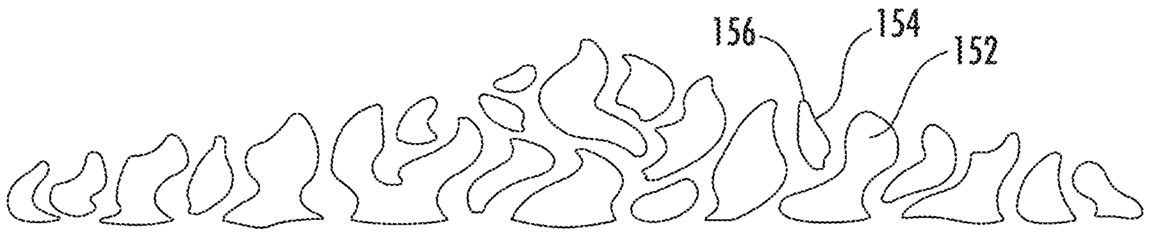
FIG. 15 is a schematic of an alternative embodiment of a flame cut-out.

Prior art flame screens 50, as shown in FIG. 13, can suffer from elongated cutouts 52 which extend the entire length which the light would be passing through. The result of the prior art flame screen 50 is that the simulated flames are elongated and unrealistic. Referring now to FIGS. 14, 15, and 16, exemplary embodiments of flame screens 150, 150' with non-continuous flame segments 152, 152' are shown. The segments 152, 152' can be generally non-continuous along a given beam path B. The flame screen 150, 150' can include a plurality of slots 152, 152' forming flame segments that are vertically or angularly non-continuous, have both curved edges 154, 154', and sharper edges 156, 156' than prior art flame screens. As shown in at least FIG. 16, a plurality of linear divergent light paths B, extend generally up from the flicker element (not shown in FIG. 16), up to 75° from a vertical center line V. As noted above, the spread of the light towards the flicker element, and up to the flame screen, is restricted by the light channel 131. A plurality of the linear divergent light paths can cross over the flame segments in a non-continuous manner such that a plurality of both long and short non-continuous light projections are created on the back wall of the fireplace. From a functional standpoint, the non-continuous segments act to start and stop (permit and block) the light transmission from the rotating flicker element, in an irregular pattern, i.e. intermittently flicker the light creating the flame to more realistically simulate the dancing irregular non-continuous image of a "flame". As seen in at least FIG. 9, the combination of the flicker element 140 having the paddles 144*a*, 144*b*, oriented such that they have differing undulating widths as well as rotational sweeping through or dipping into the light, and the flame cut-outs 152, 152' create realistic flames on the back imaging wall 110. The unique shape of both the paddles 144*a*, 144*b* and the flame segments 152 result in varied light paths from the light source 130 through the flame screen 150.

The flame segments 152, 152' can be arranged in a generally triangular pattern, as shown in FIG. 14, with the center of the pattern forming the peak 159' of the triangular pattern and the sides 158*b'* tapering downward, dramatically and, thus, forming a more pronounced fire shape. For example, the triangular pattern can include a lower straight edge 158*a'* and two concave edges 158*b'* extending upward towards a topmost vertex. In some embodiments, the triangular pattern can be an isosceles triangular pattern. The flame segments 152, 152', as shown, can have a variety of shapes and sizes, where collectively they form the flame pattern, but individually do not necessarily form a flame pattern alone in isolation.

The exemplary flame screens 150, 150' can permit the light that is reflected up from the flicker element 140 to pass through the non-continuous segments 152, 152' to create realistic flames on the rear wall 110 of the housing 101. The broken-up flames from the flame screen 150 are seen, in conjunction with an optional glow effect from the rear of the flame simulation housing to create a realistic flame.

As discussed above, some of the light, shown via arrow C, that is directed from the light source 130 towards the flicker element 140 passes by the flicker element 140 as the paddles 144 dip in and out of the path of the light. The light that passes by the flicker element can continue to the ember bed reflector 170, as seen in FIGS. 2 and 2A.

Figure 2B:
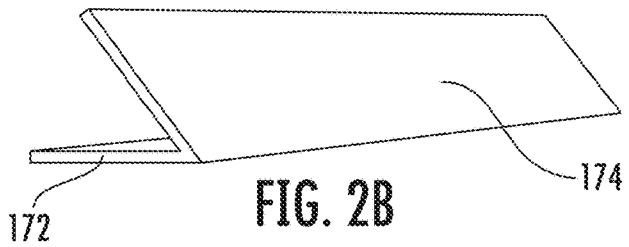
FIGS. 2B-2H are perspective views of alternative ember bed reflectors.
Figure 2C:
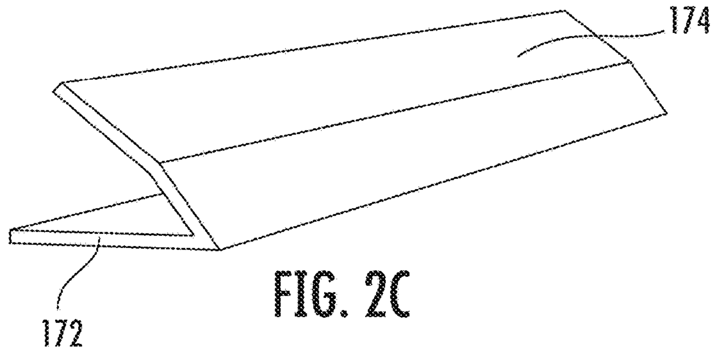
Figure 2D:
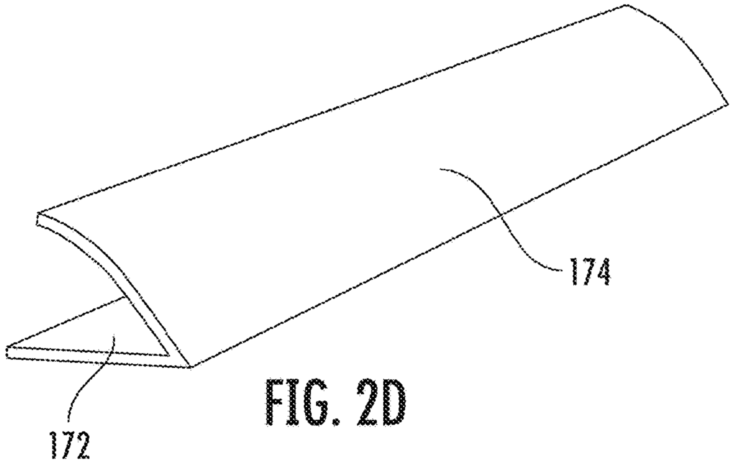
Figure 2E:
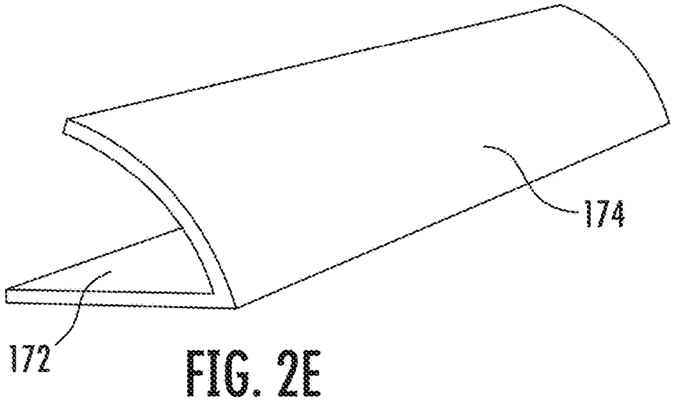
Figure 2F:
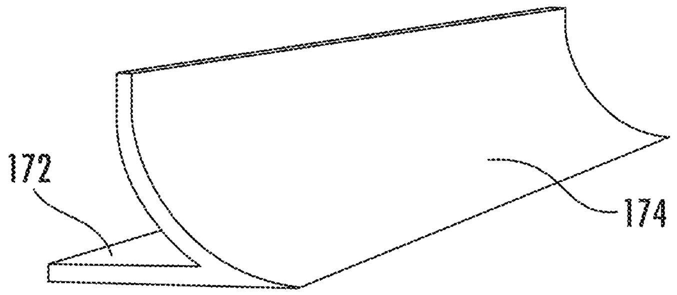
Figure 2G:
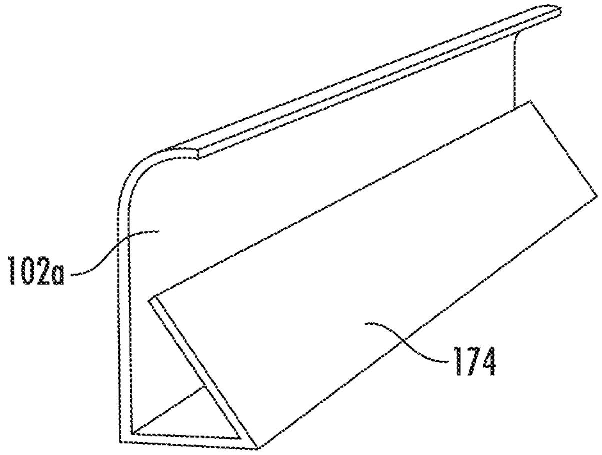
Figure 2H:
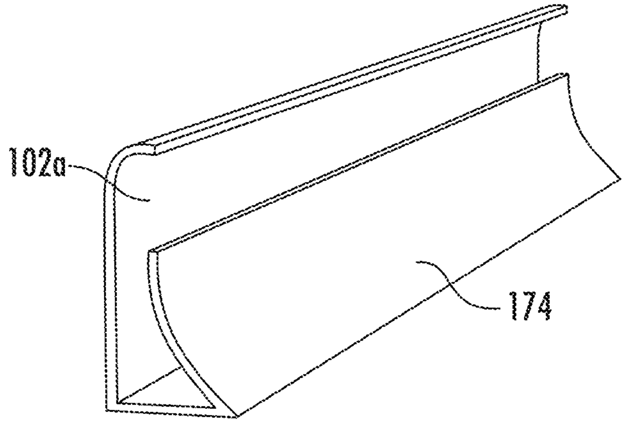
Figure 22:
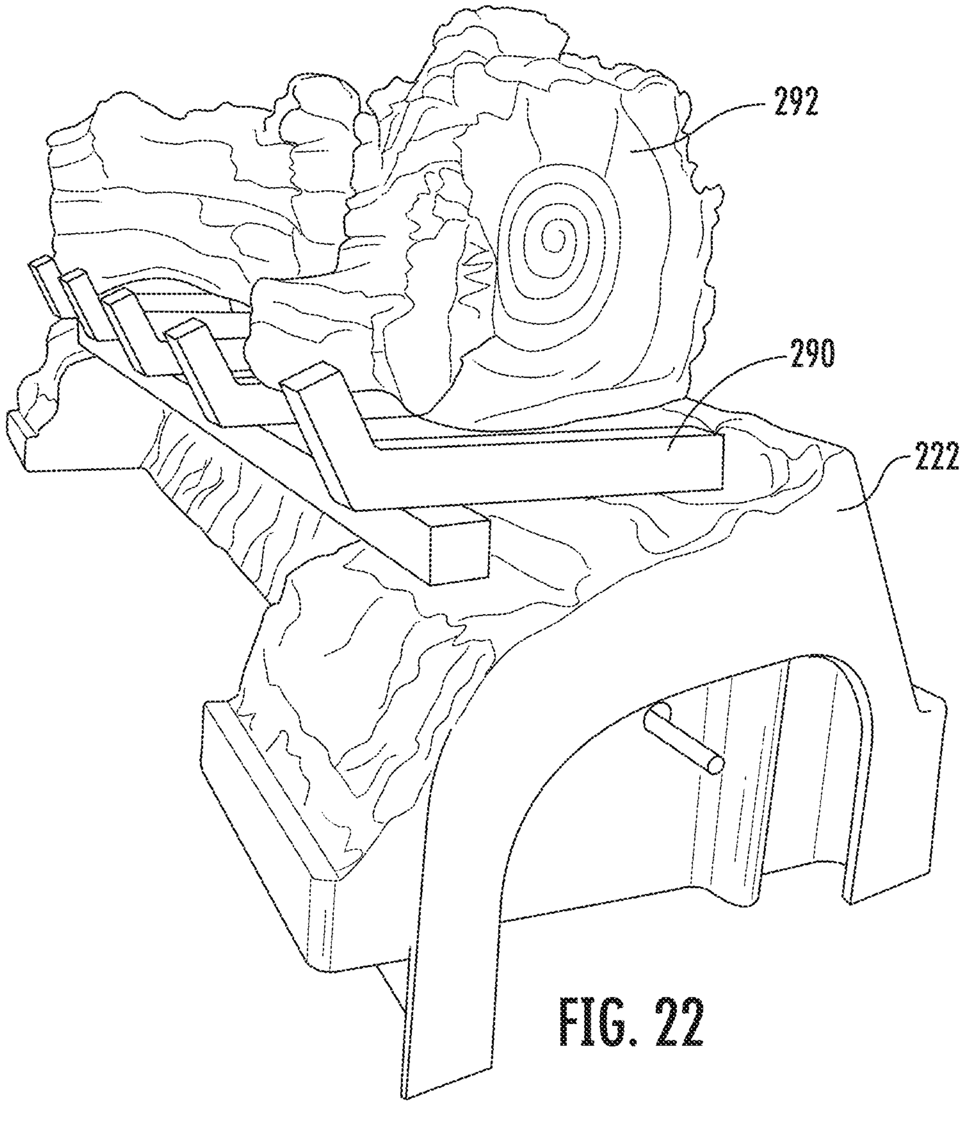
FIG. 22 is a front perspective view of the combined flame-screen and fuel bed of FIG. 20 with a simulated log.
Figure 23:
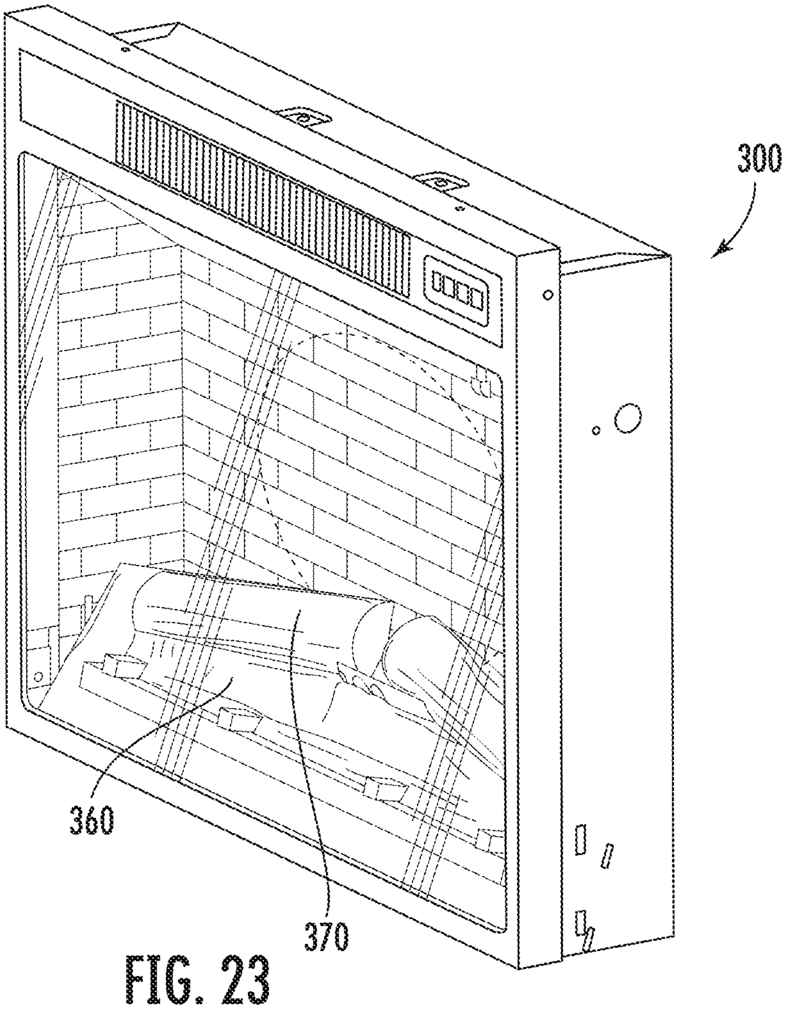
FIG. 23 is a perspective view of a third exemplary embodiment of an electric fireplace.
Figure 24:
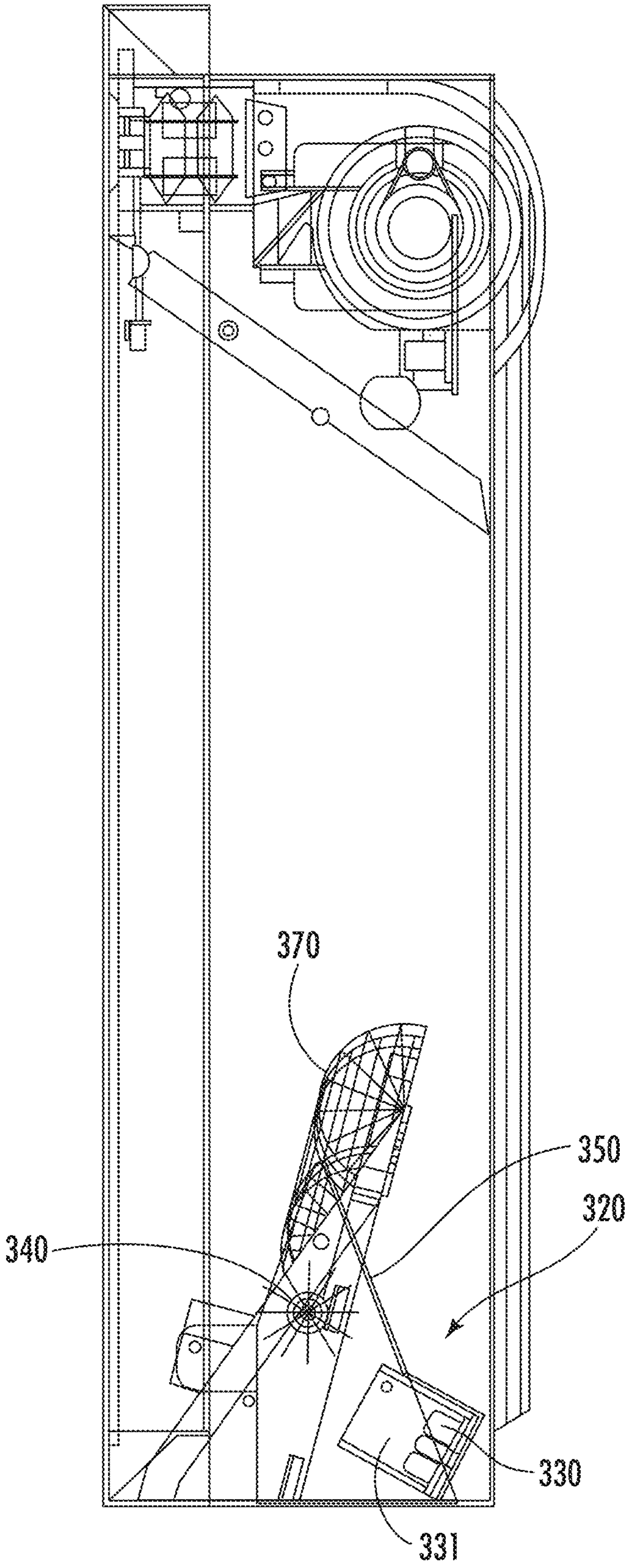
FIG. 24 is a cross sectional view of FIG. 23.
Figure 25:
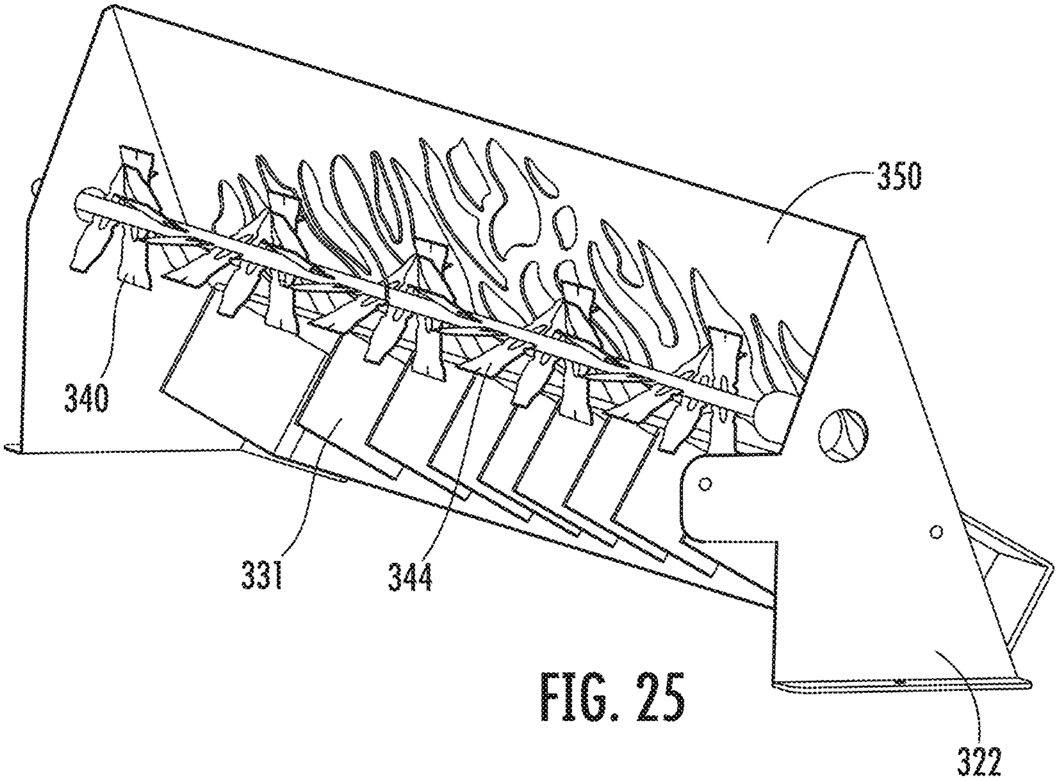
FIG. 25 is a front perspective view of the light sub-assembly of FIG. 23.
Figure 26:
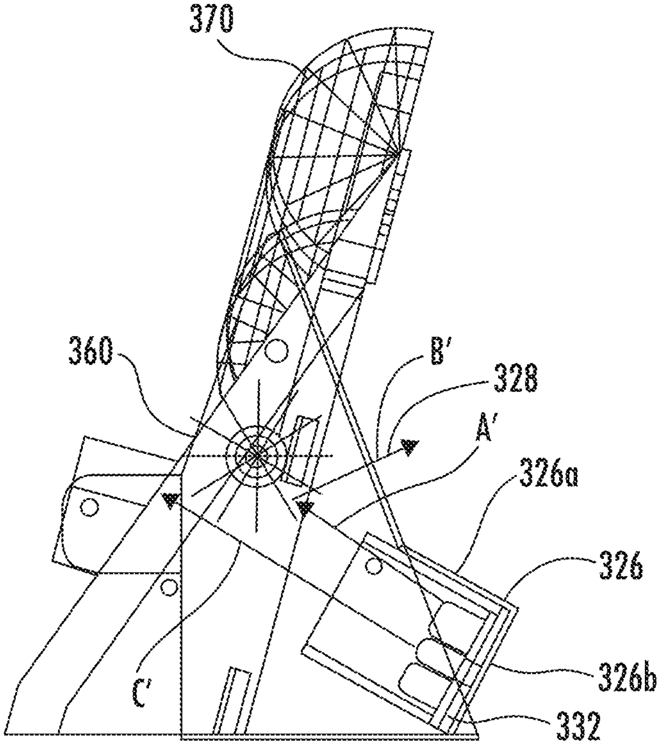
FIG. 26 is a cross-sectional view of FIG. 23.

Referring now to FIGS. 2 and 2A, the ember bed reflector 170 can have a generally exaggerated "Z" shape having a base portion 172 and at least one reflector portion 174, 176. In the illustrated embodiment, the ember bed reflector 170 can have a first reflector portion 174 and a second reflector portion 176 both extending upward at different angles. The ember bed reflector 170 can be made from a sheet of reflective material that has been bent or molded into the preferred shape. The faces of the first and second reflector portions 174, 176 are preferably reflective. In some embodiments, the ember bed reflector 170 can be made from a reflective material or coated with a reflective material. The reflector portions 174, 176 can be straight, as shown in FIG. 2B, or have a convex angled shape, as shown in FIG. 2C, or alternatively, have a curved or parabolic shape, either concave or convex, as shown in FIGS. 2D-2F. In an alternative embodiment, the second reflector portion 176 may be omitted, as shown in FIG. 2B. In some embodiments, the ember bed reflector 170 can be integrated into the cover 102*a*, as shown in FIGS. 2G and 2H. The light, shown via arrow D, can be reflected upward towards the ember bed portion 160 and the log grate 190. The ember bed 160 itself can be disposed laterally rearward towards the rear wall 110 of the enclosure 101. In some embodiments, the ember bed portions 160 and the log grate 190 can be an integral assembly formed into a unitary piece. Light from the ember bed reflector 170 can be reflected against the ember bed 160 to illuminate it and the light can be reflected up towards the log grate 190. On the log grate 190, one or more logs can be placed and the front face of the log 192, in addition to the grate 190, can be illuminated from the light, including from arrow D. A portion of the log 194 can have a shadow 196 where the light D is blocked by the grate bar 192. In some embodiments the log 194 can additionally include an internal light source 197 which may glow through the log in the area 196 where the shadow is formed by the grate bar 192. The internal illumination creates an internal glow in the shadow area 196 giving the appearance of actual glowing embers. In some alternative embodiments, logs can be illuminated from below by the light coming through the ember bed, as shown in FIG. 22 for example. In addition, or alternatively, the logs can be further illuminated by secondary smaller light sources (not shown) disposed at various locations within the logs themselves. The combination of the flicker elements 144 and the ember bed reflector 170 can advantageously illuminate the ember bed without the need for additional light source.

Figure 19:
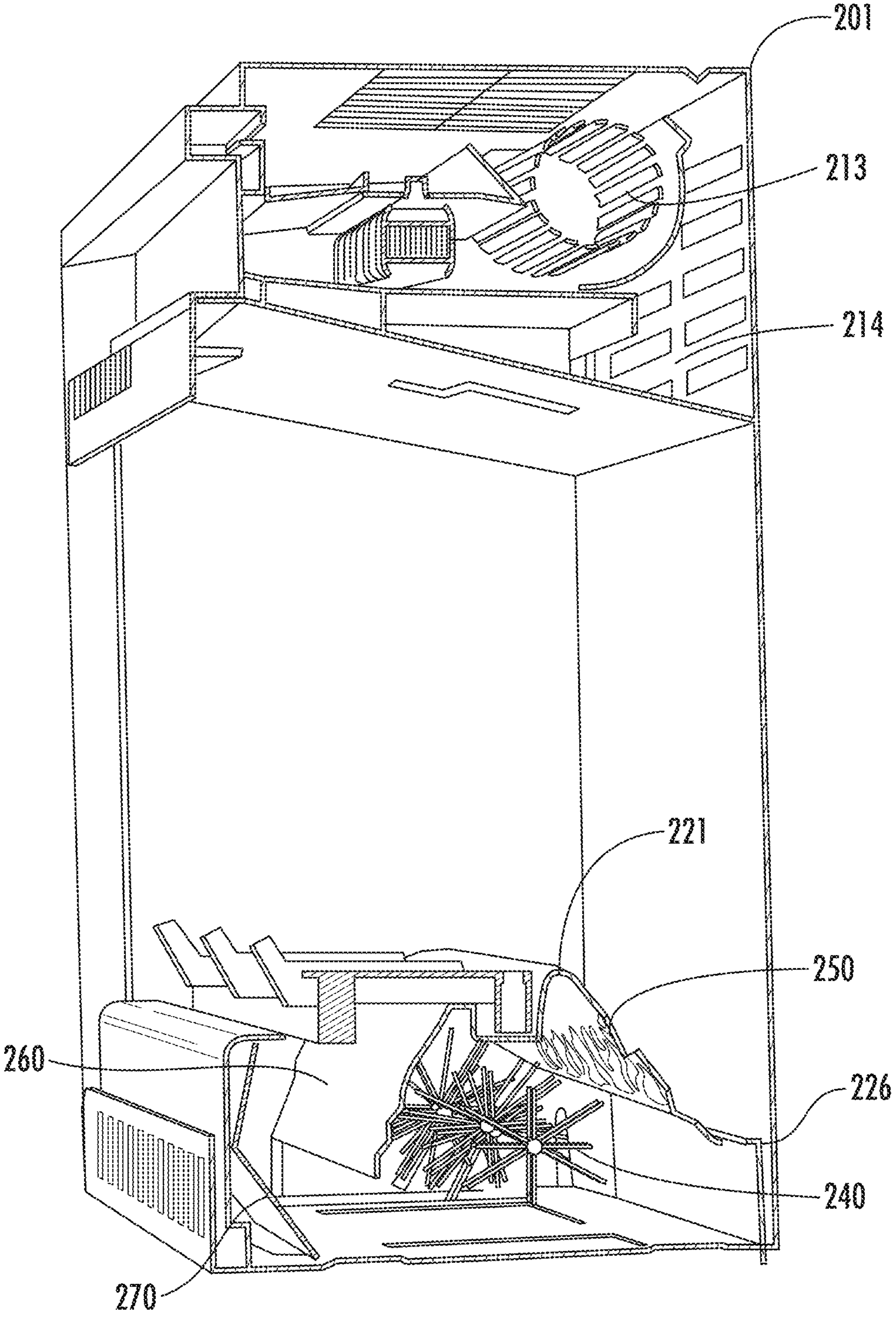
FIG. 19 is a partial perspective cross-sectional view of the fireplace of FIG. 17.
Figure 20:
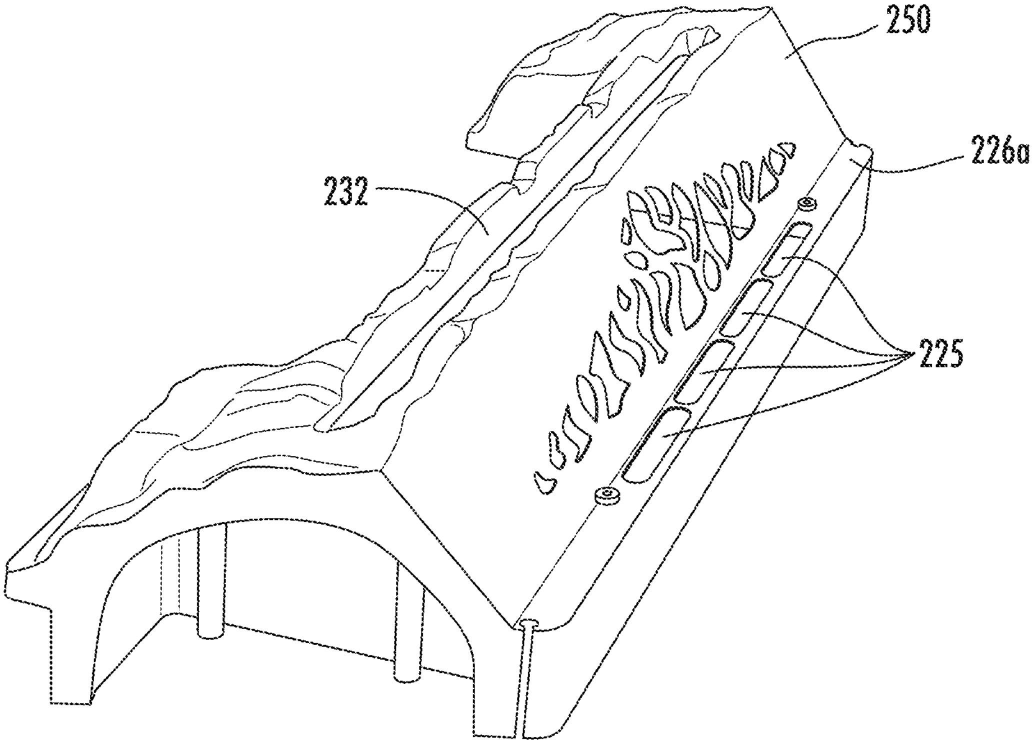
FIG. 20 is a rear perspective view of a combined flame-screen and fuel bed of the fireplace of FIG. 17.
Figure 21:
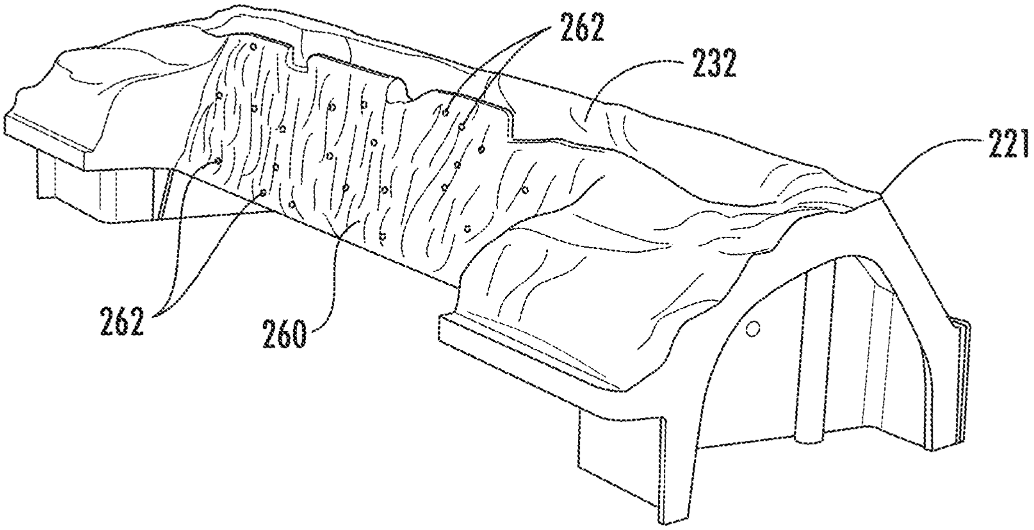
FIG. 21 is a front perspective view of the combined flame-screen and fuel bed of FIG. 20.

Referring to FIGS. 18-21, in an alternative embodiment 200, the assembly can include a fully integrated ember bed 260 and flame screen 250 which are formed or molded into a single housing, or component, 222. The embodiment of FIGS. 18-22 can be generally the same as the first embodiment of FIGS. 1-16, however in place of the discrete, separate, ember bed 160 and flame screen 150; an integrated, contoured, simulated fire simulation housing 222 can be provided. In some embodiments, the single component 222 can be manufactured from plastic, metal, or a composite material. In one example, the single component 222 can be molded plastic. As shown in FIG. 19, the integrated ember bed 260 and flame screen 250 can form a generally shallow, inverted V-shape, similar to a roof, to hide the flame screen 250 from view of the user and enhance the realism of the simulated flame. At the peak 221 of the inverted V-shape, a groove 232 can be formed to support the grates 290 which can hold the faux logs 292, as shown in FIGS. 18 and 22. In alternative embodiments, the grates 290 can be integral with the ember bed assembly. Such an integrated ember bed 260 and flame screen 250 can additionally include a plurality of cut-outs 225 on the upper horizontal piece 226*a* of the lower rear wall 226 to permit light from a light source 230 to pass through the light shield 231, similar to the cut out of FIGS. 3-5. Alternatively, in place of a plurality of smaller cut-outs 225, the upper horizontal piece 226*a* can include several medium sized windows, one large window, or no window at all. The integrated ember bed 260 can have a textured surface and/or a reflective coating. For example, the reflective coating can include a combination of glitter, reflective metal or glass flakes, miniature piercings, translucent colored stained glass 262, and/or a serrated bottom (not shown), to enhance the visual effect of burning embers. In some embodiments, the integrated ember bed 260 can include a motor and actuator arm to move the ember bed 260 with gentle pulsations to create an added visual effect of burning embers. The integrated assembly can advantageously provide for a lower cost manufacturing and assembly of the overall device 200 as there are less parts that need to be assembled and connected. In some embodiments, the reflector 270 can be integral with the ember bed as well. Alternatively, the reflector 270 can be integral with the front wall of the enclosure, as discussed above with respect to FIGS. 2G and 2H. In use, light is directed from the light source 230 past the flicker element 240 to both the ember bed reflector 270, and on to the ember bed 260, and through the flame screen 250 in the same fashion as the embodiment of FIG. 1-16. Further, a heater 213 is shown disposed in an upper compartment 214 of the housing 201. As such, a detailed discussion of the various sub-assemblies of this embodiment will not be repeated for brevity.

In a further alternative, exemplary embodiment illustrated in FIGS. 23-26, the fireplace may be designed such that the ember bed reflector is omitted to further reduce the overall footprint of the device 300. This can be accomplished by reorienting the light source 330 and the flicker element 340. For example, the flame simulation assembly 320 can include a single flame simulating light source 330 which can be used to illuminate both a flame simulation screen 350 and a combined ember bed and log assembly 360. The flame simulation assembly 320 can generally include the flame simulating light source 330, a light shield 331, a flicker element 340 which can angle the light generated by the light array, and a flame screen 350. The flame simulation assembly 320 can be a single subassembly housed by the flame simulation housing 322. The flame simulation housing 322 can have two sidewalls 324*a*, 324*b*, a lower rear wall 326, and an upper rear wall 328. In the illustrated embodiment, the lower rear wall 326 can have a generally angled "L" shape that includes an upper angled piece 326*a* and a lower angled piece 326*b*. Extending upward and forward, at an angle, from a forward edge of the upper angled piece can be the flame screen support 328, the flame screen support 328 can be at a steeper angle than the flame screen support of FIG. 1.

The single light array 330 can be disposed beneath the flame screen 350 on the lower rear wall 326*b* of the flame simulation housing 322. The light array 330 can include a plurality of bulbs disposed on a printed circuit board (PCB) or mounted on a support 332 and wired together. In the exemplary embodiment, the light array 330 can be oriented such that the PCB 332 is at an angle relative to both the rear and front walls and the bottom and top walls and the LEDs are angled upward. The angle of the PCB and the light source can be approximately 20 degrees to 40 degrees from the bottom panel of the housing. In some embodiments, the light array 330 can be a panel that includes a plurality of sources. The light channeling shield 331 can similarly be angled upward, at an angle of approximately 70 degrees, in parallel to the upper angled piece 326*a* to direct the light towards the flicker element 340. In some embodiments, the light shield 331 can be integrated, or molded, as part of the ember bed 360 and log mold 370 and/or molded with the flame screen 350, or all the aforementioned components can be molded together. The upward angle of the light channeling shield 331 and the light source 330 itself can direct a portion of the light source directly towards the ember bed 360 and logs 370. Like the other embodiments, the light source 330 projects light at the flicker element, as shown as arrow A' such that some light, shown as arrow B', is reflected towards the flame screen 350, as discussed above, and some of the light, shown as arrow C', is directed towards the ember bed 360 and logs 370 as the flicker paddles 344 dip in and out of the light path. The flicker element 340 can include the rod 342 and the flicker rod 343 can be disposed above, and forward of, the light channeling shield 331 and light source 330. The ember bed 360 and logs 370 can be a single piece molded from plastic that is selectively thinned in strategic locations (not shown), such that light may pass through the thinned portions of the plastic material, creating the glowing and/or burning ember effect. Due to the relative locations and steep angles of the light source 330, the light channel 331, flicker element 340, and the ember bed 360 can be disposed closer together, thereby permitting the depth of the device 300 to be further reduced. In some embodiments, the ember bed 360 and the flame simulation housing 322 can be integrated into a single unit, like the embodiment of FIGS. 18-22.

Figure 27:
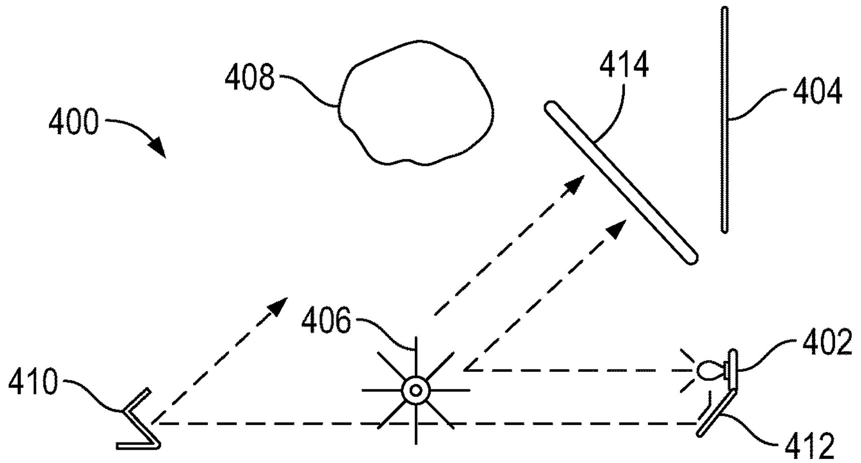
FIG. 27 is a schematic view of another alternative embodiment of a simulated fireplace assembly.

Turning to FIG. 27, there is shown another exemplary embodiment generally indicated at 400. The structure is shown schematically and is similar to the embodiment shown in FIGS. 1-15, with some modifications of the light source and reflector arrangement. The assembly 400 includes a light source 402, an imaging wall 404 disposed above the light source 402, and a rotating flicker rod 406 having a plurality of reflective flicker elements configured and arranged to reflect the light from the light source 402 and create fluctuating light on the imaging wall 402. The flicker rod 406 is disposed in the path of the light source 402. The assembly 400 further includes a simulated fuel bed 408, a front reflector 410 and a rear reflector 412 adjacent the light source 402.

In operation, a portion of the light from the light source 402 intermittently passes through the plurality of flicker elements on the rotating flicker 406 rod to illuminate the simulated fuel bed 408 and create a glowing or burning effect thereon. Unlike the above embodiments, the flicker rod 406 rotates about a central axis and the light source 402 is disposed above (rather than below) the central axis of the flicker rod 406. As in the above, embodiments, the flicker rod 406 is at least partially disposed between the light source 402 and the front reflector 410, and light from the light source 402 is reflected off the front reflector 410 to illuminate the simulated fuel bed 408. The rear reflector 412 is disposed below the light source 402 which reflects light forwardly toward the flicker rod 406 and the front reflector 410. Similar to the above embodiments the light source 402 includes a plurality of lights all disposed at a single height relative to the flicker rod 406.

The flame simulating assembly 400 further includes a flame cut out screen 414 wherein light is reflected off the plurality of flicker elements upwardly towards a flame cut out 414 before illuminating the imaging wall 404.

Figure 28:
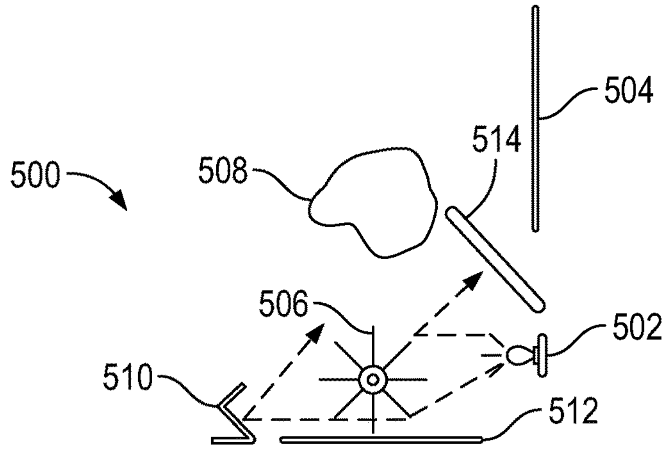
FIG. 28 is a schematic view of still another alternative embodiment of a simulated fireplace assembly.

Turning to FIG. 28 there is shown a further exemplary embodiment generally indicated at 500. The structure is shown schematically and is similar to the embodiment shown in FIGS. 1-15, with some modifications of the light source and reflector arrangement. The assembly 500 includes a light source 502, an imaging wall 504 disposed above the light source 502, and a rotating flicker rod 506 having a plurality of reflective flicker elements configured and arranged to reflect the light from the light source 502 and create fluctuating light on the imaging wall 504. The flicker rod 506 is disposed in the path of the light source 502. The assembly 500 further includes a simulated fuel bed 508, a front reflector 510 and a reflective floor (lower reflector) 512 beneath the flicker rod 506 between the light source 502 and the front reflector 410. The reflective floor (lower reflector) 512 may be mylar film or other reflective paint, such as silver paint.

In operation, a portion of the light from the light source 502 intermittently passes through the plurality of flicker elements on the rotating flicker rod 506 to illuminate the simulated fuel bed 508 and create a glowing or burning effect thereon. The flicker rod 506 rotates about a central axis and the light source 502 is disposed above the central axis of the flicker rod 506. As in the above, embodiments, the flicker rod 506 is at least partially disposed between the light source 502 and the front reflector 510, and light from the light source 502 is reflected off the front reflector 510 to illuminate the simulated fuel bed 508. The reflective floor 512 is disposed below the flicker rod 506 and light source 502 and reflects or channels light forwardly and/or upwardly toward the flicker rod 506 and the front reflector 510. Similar to the above embodiments the light source 502 includes a plurality of lights all disposed at a single height relative to the flicker rod 506.

The flame simulating assembly 500 further includes a flame cut out screen 514 wherein light is reflected off the plurality of flicker elements upwardly towards a flame cut out 514 before illuminating the imaging wall 504.

Figure 29:
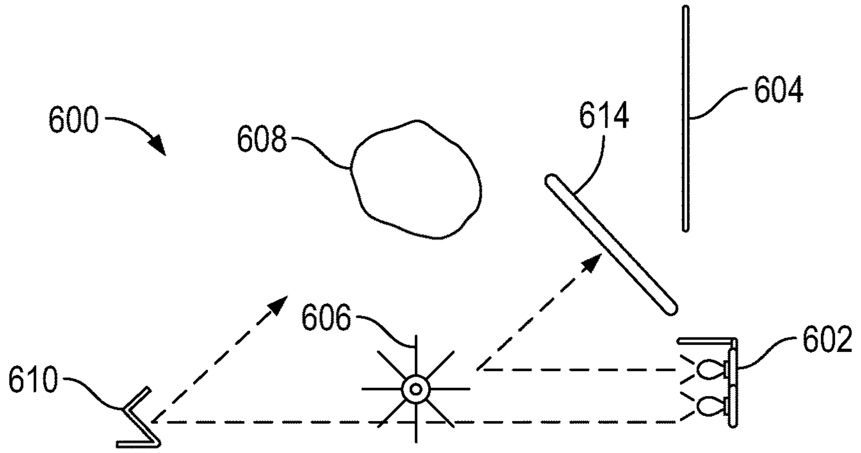
FIG. 29 is a schematic view of yet another alternative embodiment of a simulated fireplace assembly.

Turning to FIG. 29 there is shown a further exemplary embodiment generally indicated at 600. The structure is shown schematically and is similar to the embodiment shown in FIGS. 1-15, with some modifications of the light source and reflector arrangement. The assembly 600 includes a light source 602, an imaging wall 604 disposed above the light source 602, and a rotating flicker rod 606 having a plurality of reflective flicker elements configured and arranged to reflect the light from the light source 602 and create fluctuating light on the imaging wall 604. The flicker rod 606 is disposed in the path of the light source 602. The assembly 600 further includes a simulated fuel bed 608 and a front reflector 610. The light source 602 may comprise stacked rows of LED's both above and below the central axis of the flicker rod 606.

In operation, a portion of the light from the light source 602 intermittently passes through the plurality of flicker elements on the rotating flicker rod 606 to illuminate the simulated fuel bed 608 and create a glowing or burning effect thereon. The flicker rod 606 rotates about a central axis and the light source 602 is disposed both above and below the central axis of the flicker rod 606. As in the above, embodiments, the flicker rod 606 is at least partially disposed between the light source 602 and the front reflector 610, and light from the light source 602 is reflected off the front reflector 610 to illuminate the simulated fuel bed 608. As noted above, the light source 602 may include a plurality of lights disposed in stacked rows and at multiple different heights relative to the flicker rod 606.

The flame simulating assembly 600 further includes a flame cut out screen 614 wherein light is reflected off the plurality of flicker elements upwardly towards a flame cut out 614 before illuminating the imaging wall 604.

Although the embodiments shown herein illustrate a simulated flame with a front projection system onto an imaging wall, it would be appreciated by one skilled in the art that the simulated flame assembly described herein may be adapted for a rear projection configuration, or an indirect projection using one or more mirrors. In particular, instead of light projected onto an imaging wall at the back of the enclosure, the light could be projected forward onto a rear surface a light-transmitting imaging screen that is positioned forwardly and closer to the ember bed.

Further, it would be appreciated by those skilled in the art that various changes and modifications can be made to the illustrated embodiments without departing from the spirit of the present invention. All such modifications and changes are intended to be within the scope of the present invention. While the present disclosure provides for various embodiments, it is intended for the subassemblies of the various embodiments to be discrete subassemblies that can be used in the various embodiments interchangeably.

What is claimed:

1. A flame simulating assembly comprising:

a light source;

an imaging wall above the light source;

a simulated fuel bed;

a front reflector; and a rotating flicker rod disposed in the path of the light source between the light source and at least a portion of the front reflector and having a plurality of reflective flicker elements configured and arranged to create fluctuating light on a front surface of the imaging wall, wherein a first portion of the light from the light source intermittently passes through the plurality of flicker elements on the rotating flicker rod to the front reflector and is reflected off the front reflector to illuminate the simulated fuel bed, wherein the flicker rod rotates about a central axis, and wherein both the light source and at least a first portion of the front reflector are disposed below the central axis of the flicker rod.

2. The flame simulating assembly of claim 1, wherein the light source includes a plurality of lights all disposed along an axis parallel to the flicker rod.

3. The flame simulating assembly of claim 1 further comprising a flame cut out, wherein a second portion of the light from the light source is reflected off the plurality of flicker elements through said flame cut out to illuminate the front surface of the imaging wall.

4. The flame simulating assembly of claim 2 further comprising a flame cut out, wherein a second portion of the light from the light source is reflected off the plurality of flicker elements through said flame cut out to illuminate the front surface of the imaging wall.

5. The flame simulating assembly of claim 1, wherein the plurality of flicker elements comprises a plurality of varied shape flicker elements disposed on a central rotating axis.

6. The flame simulating assembly of claim 1, wherein light source consists of a horizontal array of LED lights.

7. A flame simulating assembly for providing a moving effect of flames, the assembly comprising:

a rear light source;

a firebox cavity having a rear imaging wall disposed above the light source;

a rotating flicker rod having a plurality of reflective flicker elements configured and arranged to reflect a first portion of the light along a path (A) from the light source and create a fluctuating light on a path (B) directed onto a front surface of the rear imaging wall, the flicker rod being disposed in the path of the light source;

a simulated fuel bed at least partially enclosing the rotating flicker rod; and a front reflector disposed forward of the simulated fuel bed, the fuel bed having a front opening such that a second portion of the light from the light source reaches at least a portion of the front reflector along a path (C) from the light source to the front reflector to create both direct and intermittent illumination on a path (D) onto an exterior front surface of the simulated fuel bed.

8. The flame simulating assembly of claim 7 wherein a portion of the light on path (C) reaches the front reflector directly and illuminates an exterior surface of the simulated fuel bed create a glowing effect thereon and wherein another portion of the light from the light source on path (C) intermittently passes through the plurality of flicker elements on the rotating flicker rod to intermittently reach to the front reflector and intermittently illuminate an exterior front surface of the simulated fuel bed to create a burning effect thereon.

9. The flame simulating assembly of claim 8, wherein the flicker rod rotates about a central axis and both the light source and at least a first portion of the front reflector are disposed below the central axis of the flicker rod, and wherein the flicker rod is at least partially disposed between the light source and the front reflector such that said portion of light from the light source that intermittently passes through the plurality of flicker elements is reflected off the front reflector to illuminate the simulated fuel bed.

10. The flame simulating assembly of claim 7, wherein the simulated fuel bed comprises a rear wall disposed above and rearwardly of the central axis of the flicker rod and having at least one opening therein, said light on said path (B) being directed upwardly and rearwardly through the at least one opening to create said fluctuating light on the front surface of the rear imaging wall.

11. The flame simulating assembly of claim 10, wherein the rear wall of the simulated fuel bed comprises a plurality of flame cut out openings cooperating to form a flame screen integrated with the simulated fuel bed.

12. The flame simulating assembly of claim 8, wherein the simulated fuel bed comprises a rear wall disposed above and rearwardly of the central axis of the flicker rod and having at least one opening therein, said light on said path (B) being directed upwardly and rearwardly through the at least one opening to create said fluctuating light on the front surface of the rear imaging wall.

13. The flame simulating assembly of claim 12, wherein the rear wall of the simulated fuel bed comprises a plurality of flame cut out openings cooperating to form a flame screen integrated with the simulated fuel bed.

* * * * *